United States Patent
Watanabe

(10) Patent No.: US 8,195,053 B2
(45) Date of Patent: Jun. 5, 2012

(54) OPTICAL SIGNAL PROCESSING DEVICE

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 342 days.

(21) Appl. No.: 12/617,686

(22) Filed: Nov. 12, 2009

(65) Prior Publication Data

US 2010/0166426 A1    Jul. 1, 2010

(30) Foreign Application Priority Data

Dec. 25, 2008 (JP) .................. 2008-331301

(51) Int. Cl.
*H04B 10/00* (2006.01)
(52) U.S. Cl. .......... 398/159; 398/147; 398/158; 398/81; 398/148; 398/173; 398/174; 398/175; 385/24; 385/27; 385/122; 385/123; 359/337; 359/341; 359/332; 359/326
(58) Field of Classification Search .......... 398/157, 398/158, 159, 160, 147, 148, 149, 81, 79, 398/173, 175, 97, 177, 180, 178, 33, 38, 398/176, 179, 140, 141, 146, 174; 385/24, 385/27, 122, 123, 124, 37; 359/332, 326, 359/330, 333, 341.1, 341.2, 341.3, 337, 344, 359/341
See application file for complete search history.

(56) References Cited

U.S. PATENT DOCUMENTS

| | | | |
|---|---|---|---|
| 7,043,099 | B1 | 5/2006 | Watanabe |
| 2001/0013965 | A1* | 8/2001 | Watanabe ............ 359/161 |
| 2002/0041618 | A1* | 4/2002 | Watanabe et al. ........ 372/76 |
| 2006/0051100 | A1 | 3/2006 | Watanabe |
| 2006/0198017 | A1 | 9/2006 | Inagaki et al. |
| 2007/0230518 | A1* | 10/2007 | Watanabe ............ 372/22 |
| 2010/0221014 | A1* | 9/2010 | Watanabe et al. ........ 398/81 |

FOREIGN PATENT DOCUMENTS

| | | |
|---|---|---|
| EP | 0700178 | 3/1996 |
| EP | 1033834 | 9/2000 |
| EP | 1973246 | 9/2008 |
| JP | 2000-75330 | 3/2000 |
| JP | 2006-184851 | 7/2006 |
| JP | 2007-264319 A | 10/2007 |

OTHER PUBLICATIONS

"Extended European Search Report", mailed by EPO and corresponding to European Application No. 09 170 936.0 on Apr. 6, 2010.

\* cited by examiner

*Primary Examiner* — Hanh Phan
(74) *Attorney, Agent, or Firm* — Fujitsu Patent Center

(57) ABSTRACT

An optical signal processing device includes a waveform width widening unit configured to widen a waveform width of an optical signal; and an optical limiter circuit, to which the optical signal the waveform width of which is widened is input, configured to suppress an intensity of the optical signal in a region where an input intensity and an output intensity are not proportional.

16 Claims, 22 Drawing Sheets

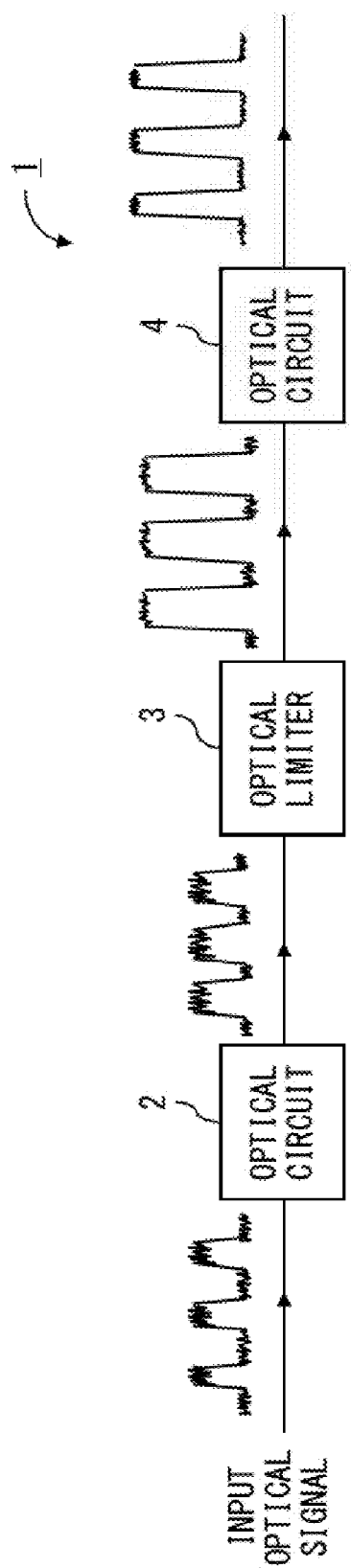
F I G. 1

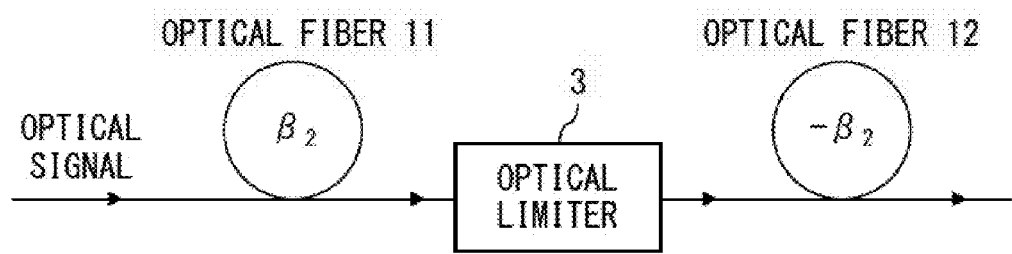
F I G. 4

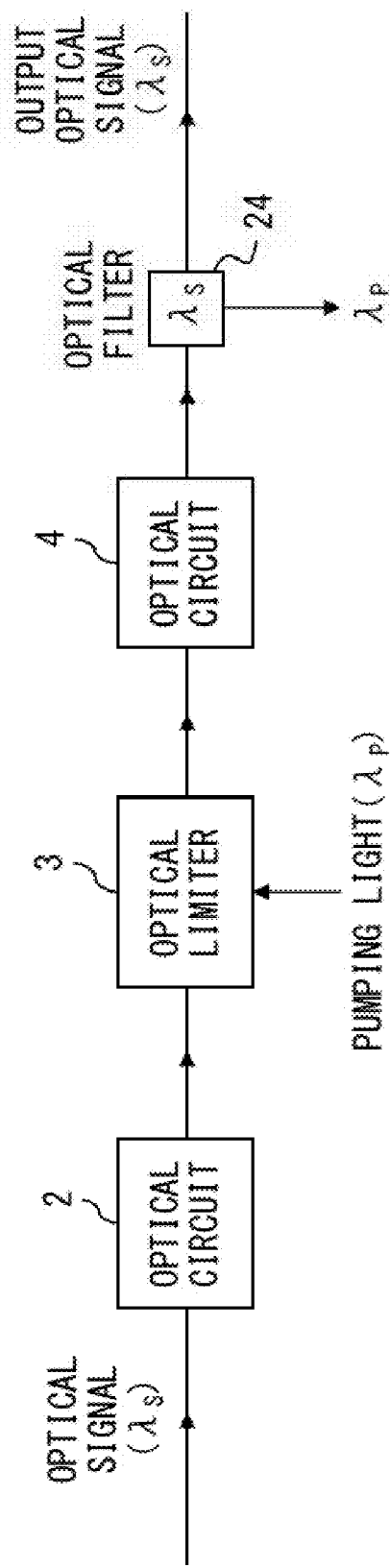
F I G. 9

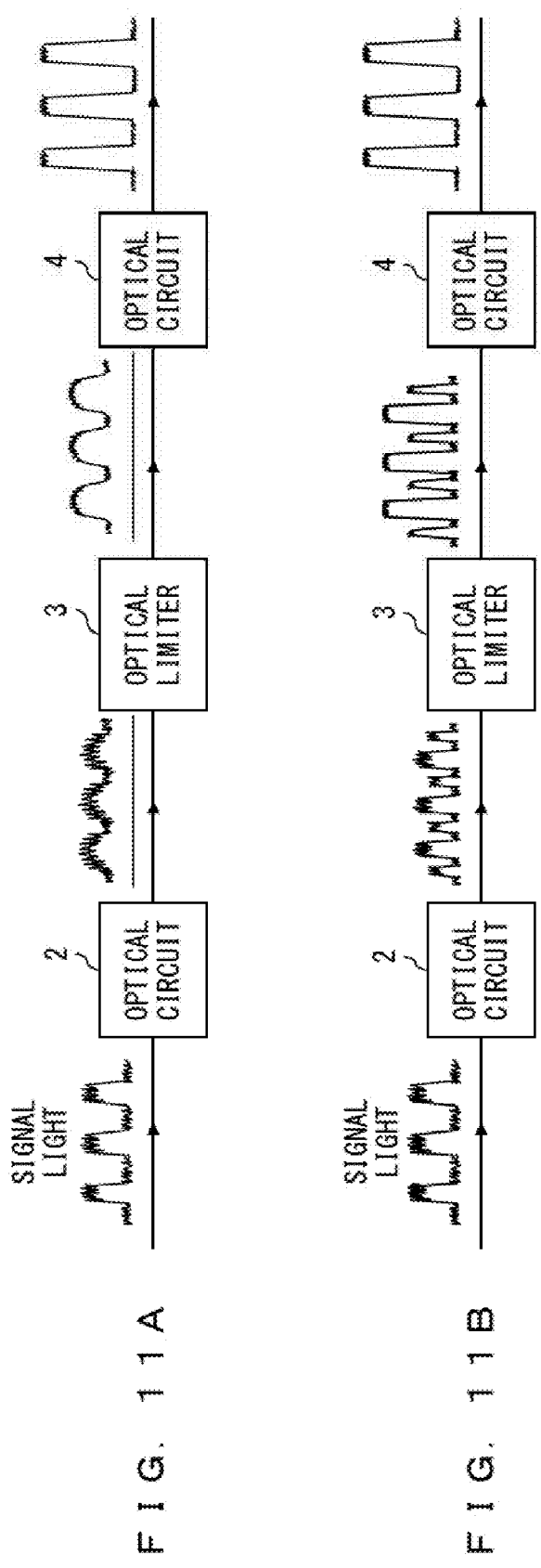

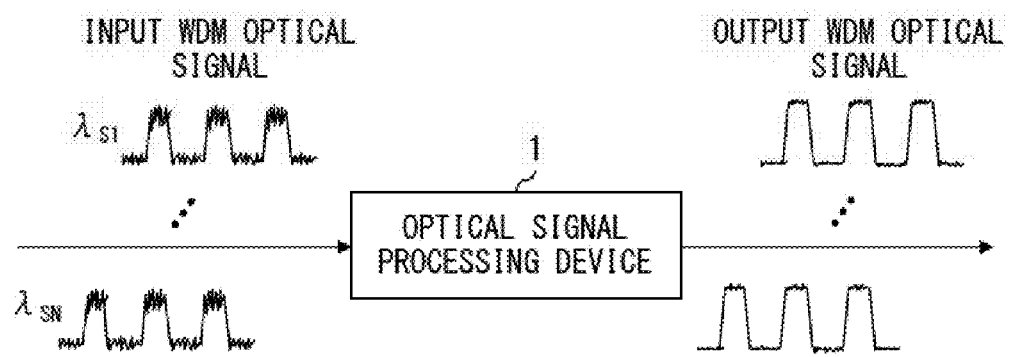
F I G. 1 2

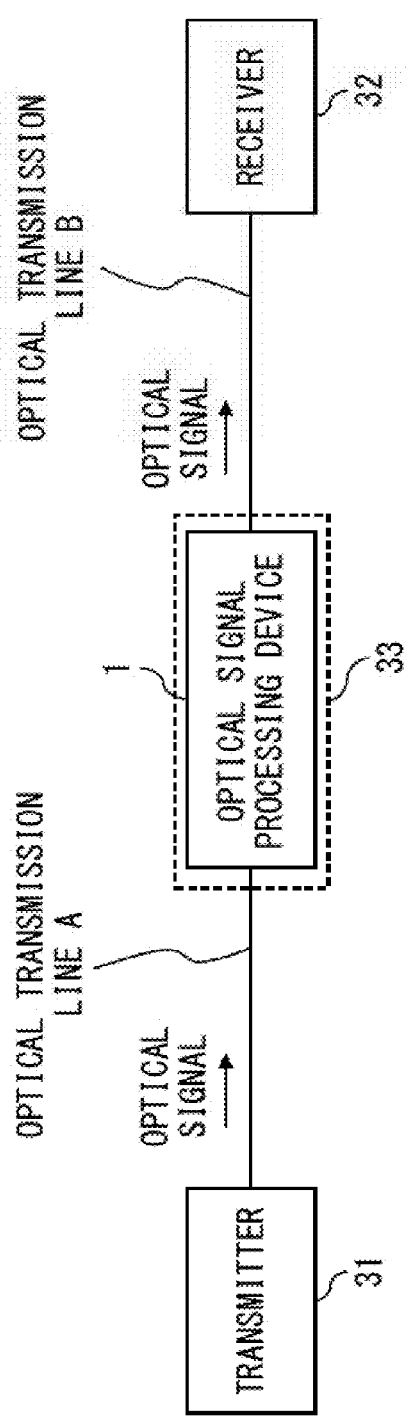
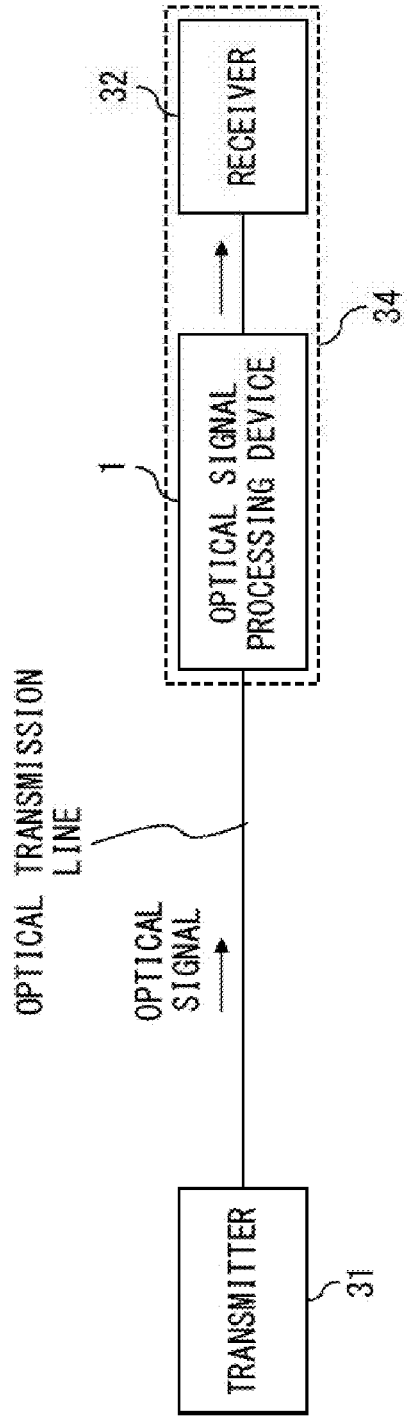
FIG. 13A
FIG. 13B

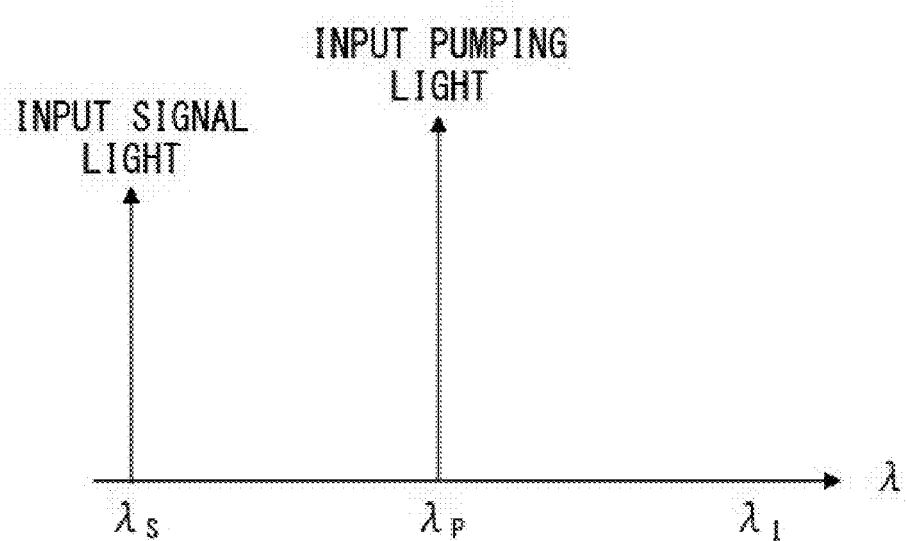
F I G. 1 5 A
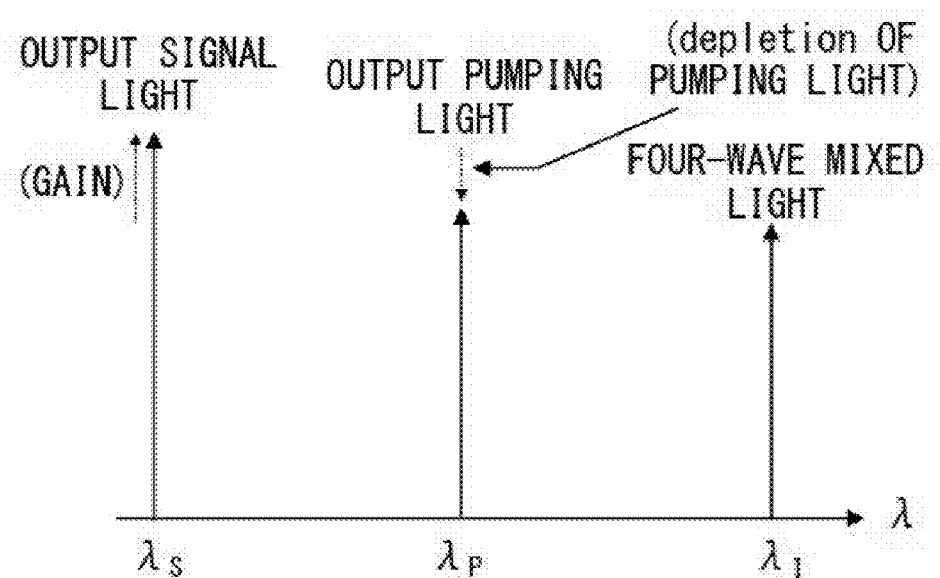
F I G. 1 5 B

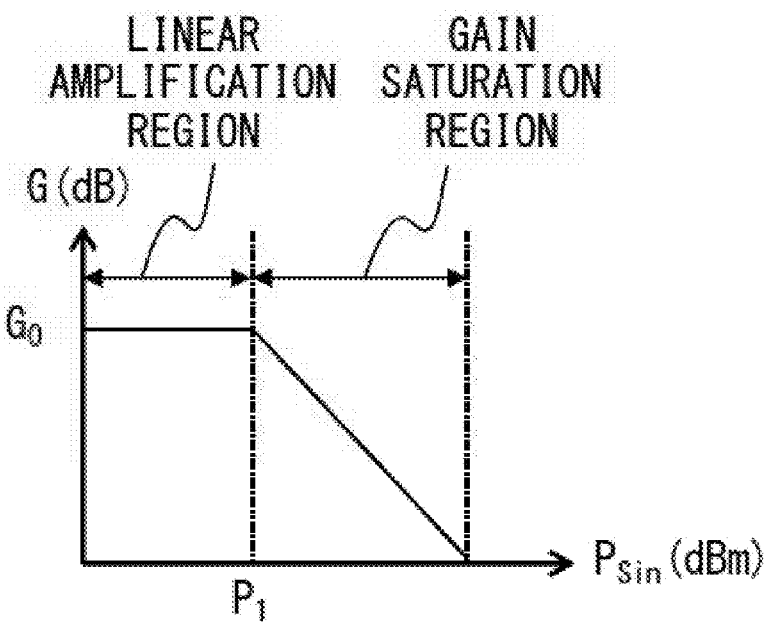
F I G. 16A
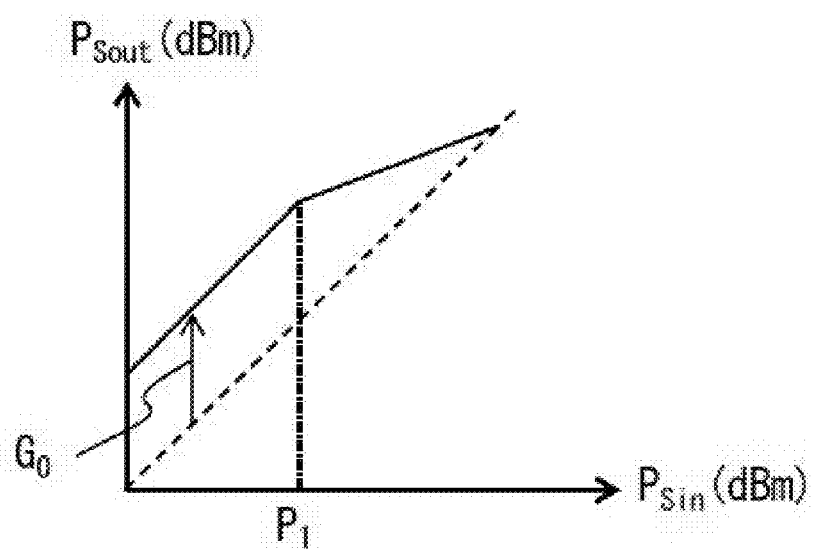
F I G. 16B

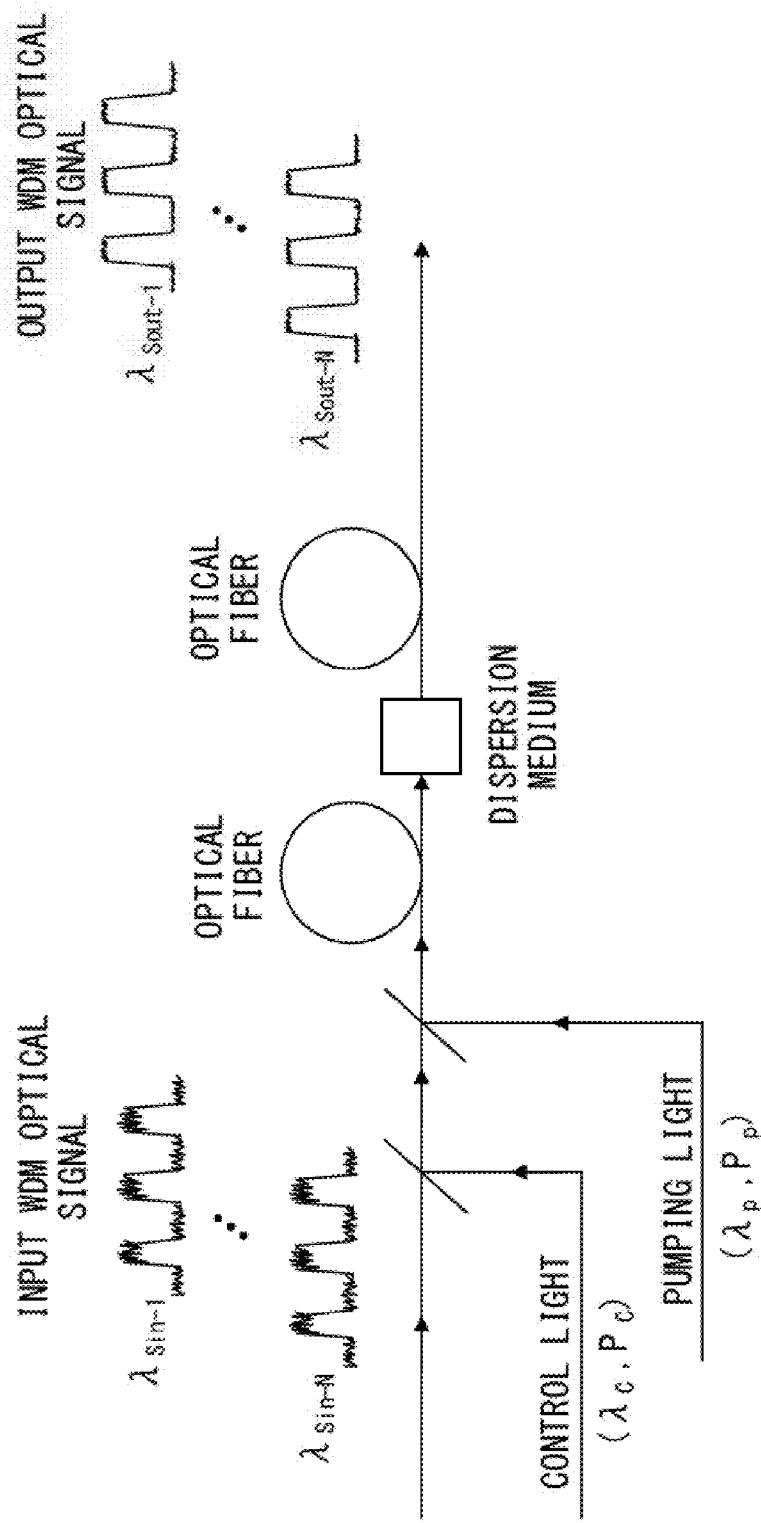
F I G. 18

OPTICAL SIGNAL PROCESSING DEVICE

CROSS-REFERENCE TO RELATED APPLICATIONS

This application is based upon and claims the benefit of priority of the prior Japanese Patent Application No. 2008-331301, filed on Dec. 25, 2008, the entire contents of which are incorporated herein by reference.

FIELD

The present invention relates to an optical signal processing device. The present invention may be applied, for example, to a device for improving the quality (such as, an optical S/N ratio and a Q factor) of an optical signal degraded by noise caused by an optical fiber transmission.

BACKGROUND

In an optical communication system, the limits of a transmission speed (bit rate of data) or a total data transmission capacity (transmission speed per channel×number of channels), and a possible transmission distance depend on an optical S/N ratio (Optical Signal-to-Noise Ratio), a Q factor, and the waveform distortion or the phase distortion of an optical signal. The waveform distortion and the phase distortion of the optical signal significantly depend on the chromatic dispersion (including higher-order dispersion) of a transmission line optical fiber, a nonlinear optical effect, etc. Moreover, the optical S/N ratio and the Q factor depend on an amplified spontaneous emission (ASE) noise caused by an optical amplifier for compensating for the loss of an optical fiber, or a noise characteristic within a transmitter or a receiver, and the like.

The following techniques for compensating for the waveform distortion of an optical signal, which is caused by chromatic dispersion, are known.
(1) A transmission line where a normal dispersion fiber and an anomalous dispersion fiber are alternately provided.
(2) A chromatic dispersion compensator such as a dispersion compensation fiber, etc.
(3) A configuration for executing electric signal processing after converting a received optical signal into an electric signal.

Up to now, a WDM (Wavelength Division Multiplexing) optical fiber transmission system for making a 10-Gbps data transmission while compensating for a transmission loss with an optical amplifier has been developed. Moreover, a higher-speed long-distance data transmission (such as 40 Gbps, 160 Gbps) and a method for providing an expandable system margin to a photonic network have been developed.

However, the optical S/N ratio and the Q factor are seriously degraded by an ASE noise caused by an optical amplifier, or the like even if dispersion compensation and distortion compensation of high precision, and an optical amplifier with high quality are combined. Therefore, a practical transmission distance is limited. To realize a long-distance optical fiber transmission of a high-speed signal, the demand for a technique of shaping a distorted optical waveform, a technique of correcting a phase distortion, and a technique of suppressing accumulated ASE noise, phase noise, etc. has been rising.

Additionally, in an optical network that functions as a communication backbone for future ultra-large capacity information, it is desired to realize an optical node device that can flexibly process the above described high-speed optical signal and is implemented by combining an optical switch, a wavelength converter, etc. Accordingly, the development of an optical signal processing device less degrading the optical S/N ratio, and a technique of improving the optical S/N ratio has been demanded.

As a technique of shaping the waveform of an optical signal, an optical waveform shaping device having first and second power controllers and a nonlinear optical medium is known. The first power controller controls the power of signal light. The second power controller controls the power of pumping light having a wavelength different from the signal light. To the nonlinear optical medium, the signal light the power of which is controlled by the first power controller, and the pumping light the power of which is controlled by the second power controller are input. The first power controller controls the power of the signal light so that a gain produced by the pumping light is saturated in the nonlinear optical medium. As a result, an optical limiter function is realized, and an optical waveform is shaped.

As related art, Japanese Laid-open Patent Publication No. 2007-264319, Japanese Laid-open Patent Publication No. 2006-184851, and Japanese Laid-open Patent Publication No. 2000-75330 are proposed.

In the conventional technology, the optical S/N ratio and the Q factor cannot be improved without changing a waveform and a spectrum. Moreover, with a method for shaping the waveform of an optical signal with an optical limiter, the amplitude noise of an ON level of the optical signal can be suppressed, but the noise of a zero level cannot be suppressed.

SUMMARY

According to an aspect of the invention, an optical signal processing device includes a waveform width widening unit configured to widen a waveform width of an optical signal; and an optical limiter circuit, to which the optical signal the waveform width of which is widened is input, configured to suppress an intensity of the optical signal in a region where an input intensity and an output intensity are not proportional.

According to another aspect of the invention, an optical signal processing device which processes an optical signal to carry information using a first state corresponding to an optical intensity higher than a certain threshold level, and a second state corresponding to an optical intensity lower than the threshold level includes a waveform transforming unit configured to transform a waveform of the optical signal so that an existence ratio of the first state increases; and an optical limiter circuit configured to suppress an intensity of the optical signal in a time domain where the optical signal output from the waveform transforming unit is in the first state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates a configuration of an optical signal processing device;

FIG. 4 illustrates a first embodiment of an optical signal processing device;

FIG. 9 illustrates a sixth embodiment of the optical signal processing device;

FIGS. 11A and 11B illustrate an eighth embodiment of the optical signal processing device;

FIG. 12 illustrates an embodiment of a method for processing a WDM optical signal;

FIGS. 13A and 13B illustrate a configuration using an optical signal processing device in a communication system;

FIGS. 15A and 15B are explanatory views of depletion;

FIGS. 16A and 16B illustrate a relationship between a gain obtained in a nonlinear optical medium and the power of signal light;

FIG. 18 illustrates another embodiment of the optical limiter;

DESCRIPTION OF EMBODIMENTS

Figure 2:
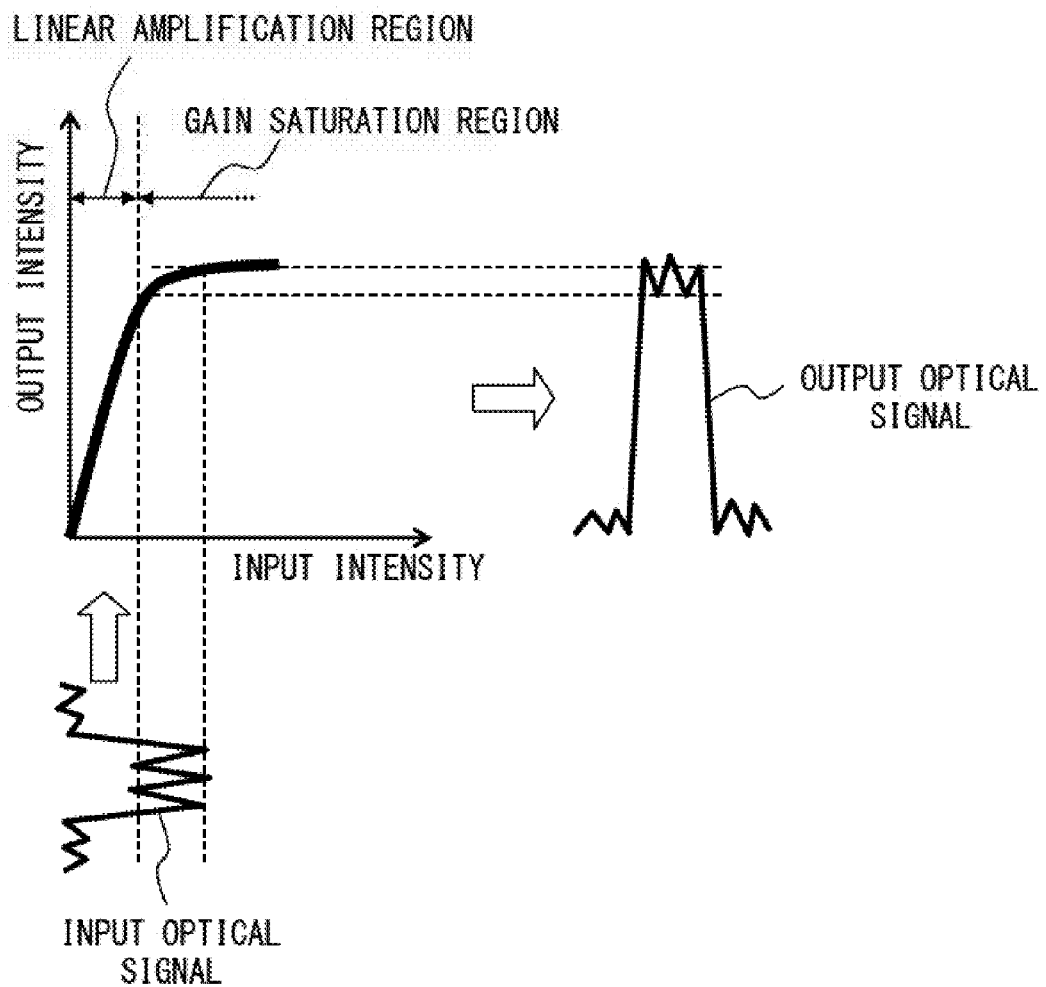
FIG. 2 is an explanatory view of operations of an optical limiter.

FIG. 1 illustrates a configuration of an optical signal processing device according to an embodiment. The optical signal processing device 1 is provided, for example, in a repeater station or a receiving station of an optical transmission system although the device is not particularly limited. The optical signal processing device 1 processes an optical signal transmitted via an optical transmission line. Moreover, the optical signal processed by the optical signal processing device 1 carries information using an ON level (a first state corresponding to an optical intensity higher than a certain threshold level), and a zero level (a second state corresponding to an optical intensity lower than the threshold level) although the optical signal is not particularly limited. Examples of the optical signal include signal light obtained by modulating an RZ (Return-to-zero) pulse with optical phase modulation or optical frequency modulation, etc. as well as signal light modulated with optical intensity modulation.

An optical circuit 2 adjusts the ratio of a duration when an optical signal is at an ON level to a duration when the optical signal is at a zero level (hereinafter referred to as an existence ratio). Specifically, the optical circuit 2 increases the existence ratio of the ON level by increasing the length of time when the optical signal is at the ON level and by reducing the length of time when the optical signal is at the zero level. As one example, the optical circuit 2 widens the waveform width (namely, the pulse width) of an optical signal on a time axis. The existence ratio is similar to the so-called duty. However, the existence ratio may differ for each time slot although the duty generally has the same value in a plurality of consecutive time slots.

An optical limiter 3 suppresses the intensity of the optical signal in a region where an input intensity and an output intensity are not proportional. Namely, the optical limiter 3 can suppress the noise on the ON level of the optical signal. The optical limiter 3 is implemented, for example, with an optical parametric amplifier using a third-order nonlinear optical effect or a second-order nonlinear optical effect, or a Raman amplifier. Such an optical amplifier is referred to, for example, in Japanese Laid-open Patent Publication No. 2007-264319. In this case, the amplitude noise of the ON level of an optical signal is suppressed in the gain saturation region of the optical amplifier. Note that the optical limiter 3 does not always need to amplify an optical signal.

An optical circuit 4 restores the existence ratio of the optical signal, which is adjusted by the optical circuit 2, to a state before the optical signal is input to the optical circuit 2. Namely, the optical circuit 4 performs inverse conversion of the waveform conversion performed by the optical circuit 2. In other words, the optical circuit 4 narrows the waveform width (namely, the pulse width) of the optical signal on the time axis. The optical signal processing device 1 does not always need to include the optical circuit 4. Namely, the optical signal processing device 1 may be configured to include the optical circuit 2 and the optical limiter 3 (without the optical circuit 4).

Operations of the optical signal processing device 1 are described next. Initially, operations of the optical limiter 3 are described. In the optical limiter 3, an output intensity is proportional to an input intensity in a region where the intensity of an input optical signal is low, as illustrated in FIG. 2. However, the output intensity is not proportional to the input intensity in a region where the intensity of the input optical signal is high. Namely, a gain is saturated in the region where the intensity of the input optical signal is high.

Generally, for an optical signal transmitted via an optical transmission line, an amplitude noise is generated on both of the ON level and the zero level. Such an optical signal with the noise is input to the optical limiter 3. Assume that the zero level and the ON level of the input optical signal respectively belong to a linear amplification region and a gain saturation region at this time. In this case, the amplitude noise of the zero level of the optical signal is amplified in the linear amplification region. However, the amplitude noise of the ON level of the optical signal is suppressed in the gain saturation region. Namely, the optical limiter 3 can suppress the amplitude noise of the ON level of the optical signal.

Figure 3A:
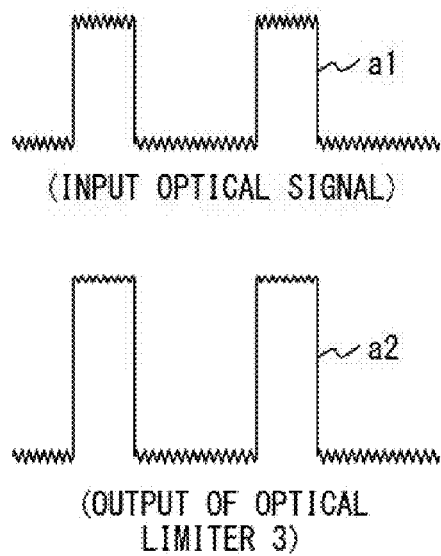
FIGS. 3A and 3B are explanatory views of an effect produced by changing an existence ratio.
Figure 3B:
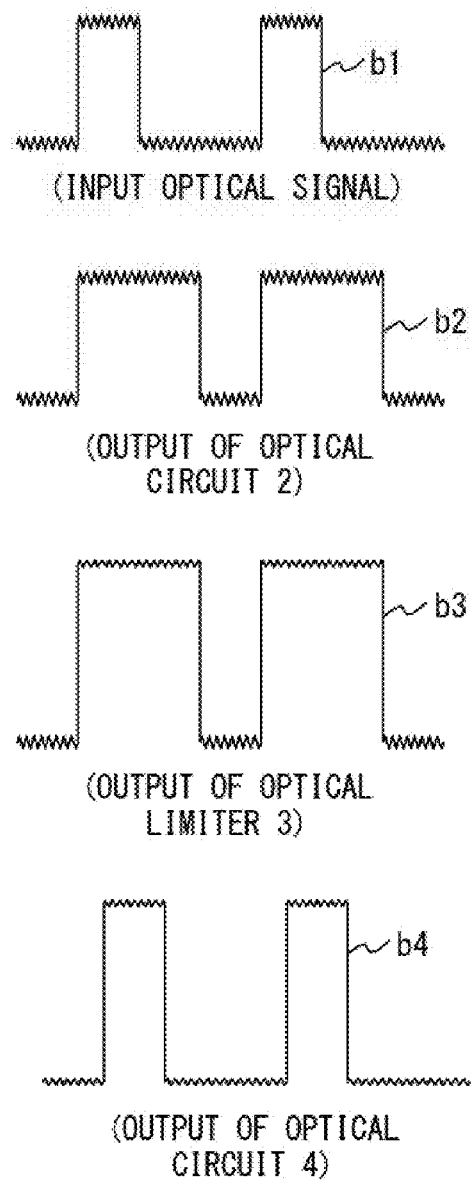

FIGS. 3A and 3B are explanatory views of an effect produced by changing the existence ratio of the optical signal. FIG. 3A illustrates a waveform in the case where the existence ratio of the optical signal is not changed (namely, the optical circuits 2 and 4 are not included). An optical signal a1 is input to the optical limiter 3. Here, both of the ON level and the zero level of the optical signal a1 are ridden with an amplitude noise. When the optical signal a1 is input to the optical limiter 3, the noise of the ON level is suppressed as described with reference to FIG. 2. However, the noise of the zero level is not suppressed.

FIG. 3B illustrates the waveform of the optical signal processed by the optical signal processing device 1 according to the embodiment. An optical signal b1 is input to the optical circuit 2. Here, assume that the optical signal b1 is the same as the optical signal a1. The optical circuit 2 generates an optical signal b2 by widening the waveform width of the optical signal b1. To the optical limiter 3, the optical signal b2 the wavelength width of which is widened is input. The optical limiter 3 suppresses the noise of the ON level of the optical signal b2. At this time, the existence ratio of the ON level of the optical signal b2 is higher than the optical signal a1 illustrated in FIG. 3A. Accordingly, the time period where the noise is suppressed in the optical signal b2 is longer than that where the noise is suppressed in the optical signal a1. The optical limiter 3 outputs an optical signal b3 the noise of which is suppressed.

The optical signal b3 is input to the optical circuit 4. The optical circuit 4 restores the existence ratio of the ON level of the optical signal b3 to the state before the optical signal is input to the optical circuit 2 (namely, the state of the optical signal b1). Namely, the optical circuit 4 generates an optical signal b4 by narrowing the waveform width of the optical signal b3. At this time, the noise of the ON level of the optical signal b3 is suppressed in a longer time period. Therefore, the noise of the zero level of the optical signal b4 obtained by narrowing the waveform width of the optical signal b3 is smaller than that of the optical signal a2 illustrated in FIG. 3A.

As described above, the optical signal processing device 1 includes the optical limiter 3 for suppressing the noise of the ON level of an optical signal, and increases the existence ratio of the ON level at the input side of the optical limiter 3. With this configuration, a time period where the noise is suppressed increases, and the amount of noise of an optical signal decreases as a whole. Accordingly, the noise of the zero level is also suppressed when the waveform width of the optical signal is restored. As a result, the quality (S/N ratio, Q factor, etc.) of the optical signal is improved.

FIG. 4 illustrates a first embodiment of the optical signal processing device 1. In the first embodiment, the optical circuits 2 and 4 are respectively implemented with a chromatic dispersion medium. In FIG. 4, the optical circuit 2 is an optical fiber 11, and the optical circuit 4 is an optical fiber 12. In this case, assuming that the chromatic dispersion of the optical fiber 11 is $\beta_2$, the chromatic dispersion of the optical fiber 12 is, for example, $-\beta_2$. Namely, the optical fiber 12 compensates for the chromatic dispersion of the optical fiber 11. The dispersion of the optical fiber 11 may be normal dispersion or anomalous dispersion. Moreover, the chromatic dispersion may be high-order dispersion other than the above described second-order dispersion, or a combination of the second-order dispersion and high-order dispersion.

The waveform width of an optical signal is widened by the chromatic dispersion of the optical fiber 11. The optical fiber 12 compensates for the chromatic dispersion of the optical fiber 11. Accordingly, the existence ratio of the ON level of the optical signal output from the optical fiber 12 is almost the same as that in the state before the optical signal is input to the optical fiber 11.

The amount of chromatic dispersion of the optical fiber 11 is not particularly limited. Here, if the amount of chromatic dispersion of the optical fiber 11 is increased, the existence ratio of the ON level of the optical signal further increases, leading to a higher noise suppression effect. However, if the amount of chromatic dispersion of the optical fiber 11 is excessively increased, the quality of the optical signal is degraded by inter-symbol interference. Moreover, if the amount of chromatic dispersion of the optical fiber 11 is excessively increased, this chromatic dispersion may not be compensated for. Accordingly, the amount of chromatic dispersion of the optical fiber 11 may be determined according to the bit rate of data carried by the optical signal. Otherwise, the amount of chromatic dispersion of the optical fiber 11 may be adjusted while monitoring the quality of the output signal of the optical signal processing device 1 as will be described in detail later.

In FIG. 4, the amounts of the chromatic dispersion of the optical fibers 11 and 12 are identical to each other (although their signs are opposite). However, the amount of chromatic dispersion of the optical fibers 11 and 12 do not need to be identical to each other. Namely, the amounts of chromatic dispersion of the optical fibers 11 and 12 may be made different so that, for example, the quality of the optical signal output from the optical signal processing device 1 or the quality in the receiving station is optimized.

Additionally, polarization mode dispersion may be provided to the optical signal in the optical fiber 11. In this case, the optical fiber 12 is designed to compensate for the polarization mode dispersion of the optical fiber 11.

Figure 5:
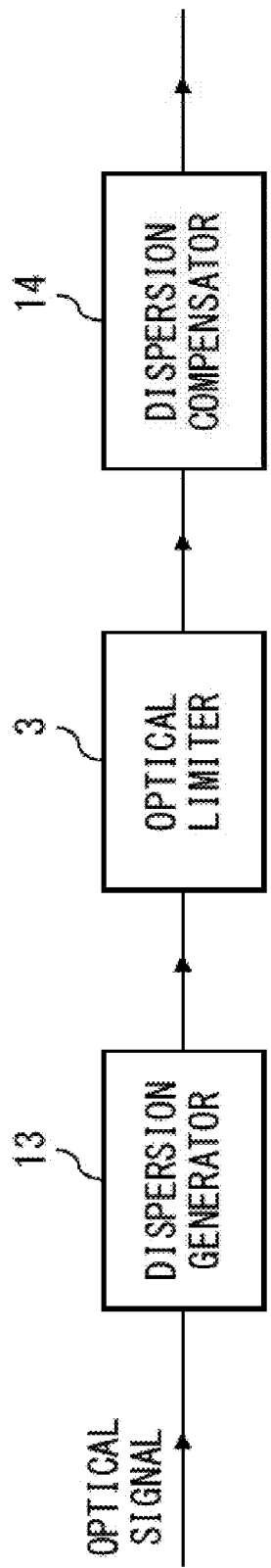
FIG. 5 illustrates a second embodiment of the optical signal processing device.

FIG. 5 illustrates a second embodiment of the optical signal processing device 1. In the second embodiment, the optical circuit 2 is a dispersion generator (dispersion emulator) 13. The dispersion generator 13 is implemented, for example, with a dispersion fiber or a VIPA (Virtually Imaged Phased Array) dispersion generator. The optical circuit 4 is a dispersion compensator 14. The dispersion compensator 14 is implemented, for example, with a dispersion compensation fiber or a VIPA dispersion compensator. The VIPA has a chromatic dispersion element (VIPA plate) implemented by coating a reflection film on both sides of a thin plate, and a reflection mirror. The VIPA can generate desired chromatic dispersion, for example, by adjusting the position of the reflection mirror. Namely, the VIPA can operate as a variable chromatic dispersion generator or a variable chromatic dispersion compensator.

Figure 6:
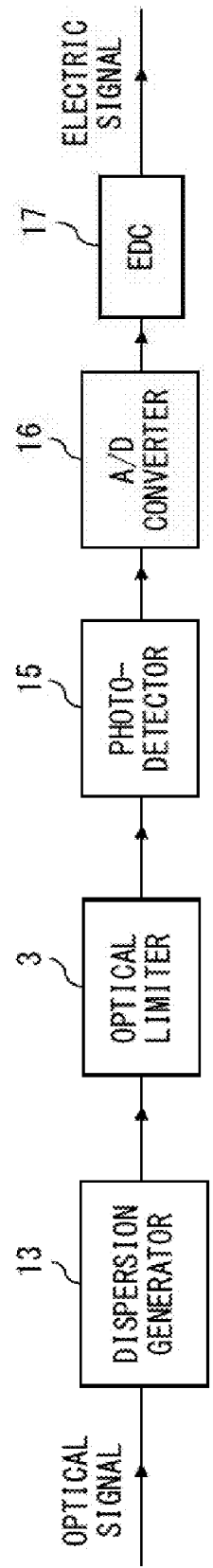
FIG. 6 illustrates a third embodiment of the optical signal processing device.

FIG. 6 illustrates a third embodiment of the optical signal processing device 1. In the third embodiment, dispersion provided by the dispersion generator 13 is compensated for after an optical signal is converted into an electric signal. Accordingly, the optical circuit 4 in the third embodiment includes a photo detector 15, an A/D converter 16, and a digital signal processing circuit 17. The photo detector 15 is, for example, a photo diode, and converts the optical signal output from the optical limiter 3 into an electric signal. The A/D converter 16 converts the signal obtained by the photo detector 15 into digital data. The digital signal processing circuit 17 is, for example, an electrical dispersion compensator (EDC), and executes a dispersion compensation process for digital data that represents the optical signal output from the optical limiter 3.

Figure 7:
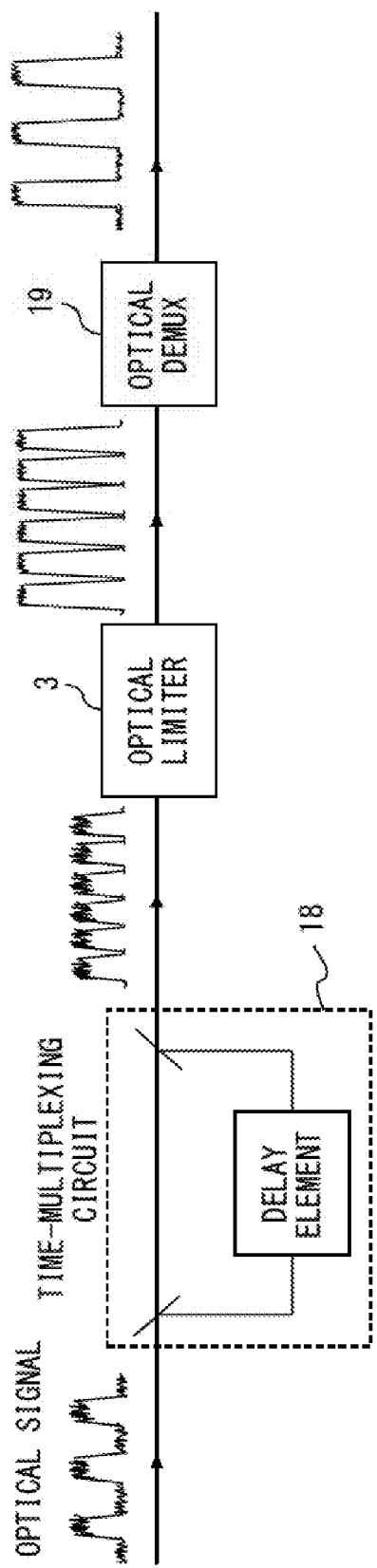
FIG. 7 illustrates a fourth embodiment of the optical signal processing device.

FIG. 7 illustrates a fourth embodiment of the optical signal processing device 1. In the fourth embodiment, the existence ratio of the ON level of an optical signal is increased by a time multiplexing circuit 18. The time multiplexing circuit 18 includes an optical branch element, a delay element, and an optical combining element. The optical branch element generates first and second optical signals by branching an input optical signal. The delay element delays the second optical signal. The optical combining element combines the first optical signal and the second optical signal delayed by the delay element. The delay time of the delay element is adjusted so that the first optical signal and the delayed second optical signal do not overlap. In this example, the number of pulses in the optical signal is doubled by passing through the time multiplexing circuit 18. At the output side of the optical limiter 3, an optical demultiplexing circuit (DEMUX) 19 is provided. The optical demultiplexing circuit 19 selects and outputs either of the multiplexed first and second optical signals.

Figure 8:
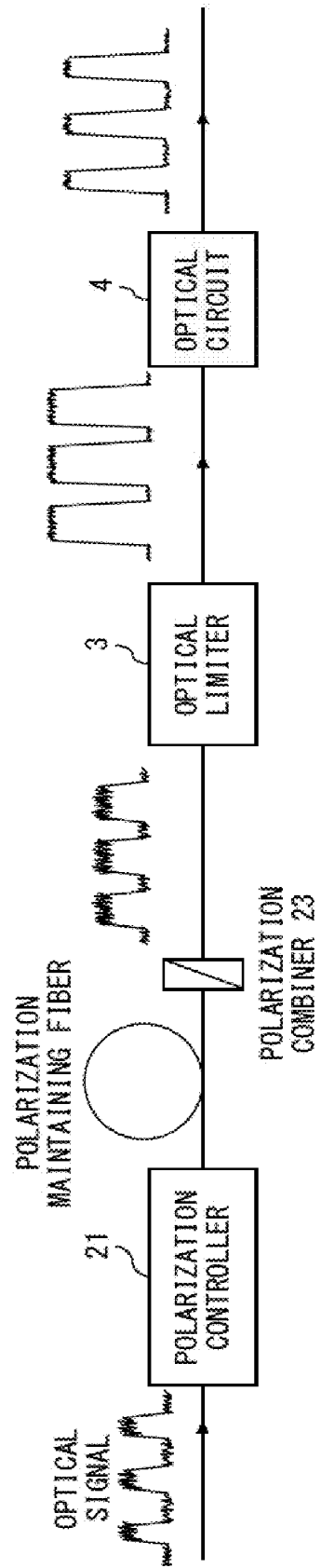
FIG. 8 illustrates a fifth embodiment of the optical signal processing device.

FIG. 8 illustrates a fifth embodiment of the optical signal processing device 1. The fifth embodiment includes a polarization controller 21, a polarization maintaining fiber 22, and a polarization combiner 23 in order to widen the waveform width of an optical signal. The polarization maintaining fiber has mutually orthogonal first and second principal polarization axes. The polarization controller 21 is provided at the input side of the polarization maintaining fiber 22, and controls the polarization of an input optical signal to align 45 degrees with respect to the first and the second principal polarization axes of the polarization maintaining fiber 22. The polarization combiner 23 polarization-combines optical signals (polarization components) output from the polarization maintaining fiber 22. The optical circuit 4 is provided if necessary, and narrows the pulse width of the optical signal output from the optical limiter 3.

FIG. 9 illustrates a sixth embodiment of the optical signal processing device 1. In the sixth embodiment, the optical limiter 3 is an optical amplifier. The optical limiter 3 implements an optical intensity limiter function by using pumping light, and amplifies an optical signal. In this embodiment, the optical signal is carried by signal light having a wavelength $\lambda_S$. The wavelength $\lambda_P$ of the pumping light is different from the wavelength $\lambda_S$. The optical signal processing device 1 has an optical filter 24 for transmitting the wavelength $\lambda_S$ at the output side of the optical circuit 4. The optical filter 24 filters out the wavelength component of the pumping light.

Figure 10:
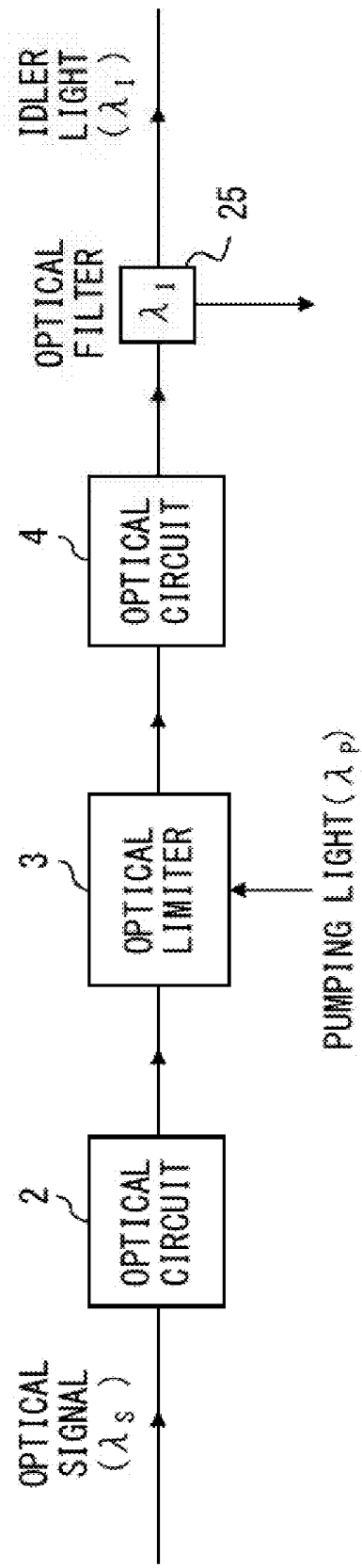
FIG. 10 illustrates a seventh embodiment of the optical signal processing device.

FIG. 10 illustrates a seventh embodiment of the optical signal processing device 1. Also in the seventh embodiment, the optical limiter 3 is an optical amplifier. In the seventh embodiment, however, idler light of signal light is generated with a parametric effect of the optical amplifier. The idler light is the phase-conjugate light of the signal light, and has a wavelength $\lambda_I$. Moreover, the idler light carries the same information as the signal light. Here, the frequency $\omega_S$ of the signal light, the frequency $\omega_P$ of the pumping light, and the frequency $\omega_I$ of the idler light satisfy the following relationship.

$$\omega_P - \omega_I = \omega_S - \omega_P \neq 0 \tag{1}$$

The optical signal processing device 1 has an optical filter 25 for transmitting the wavelength $\lambda_I$ at the output side of the optical circuit 4. The optical filter 25 filters out the wavelength component of the signal light, and that of the pumping light.

The first to the seventh embodiments refer to the method for widening the pulse width of an optical signal, or the method for increasing the existence ratio of the ON level of an optical signal. However, operations of the optical signal processing device 1 according to the embodiments are not limited to these methods. For example, the optical circuit 2 may use a chirp and chromatic dispersion in order to increase the existence ratio of the ON level of an optical signal. In this case, a certain chirp may be provided to the optical signal in a transmitting station of the optical signal. Moreover, the optical circuit 4 may be implemented, for example, with a pulse compression optical circuit or an optical switch when narrowing the pulse width of the optical signal.

If a chromatic dispersion medium is used as the optical circuits 2 and 4, the waveform of an optical signal is transformed by chromatic dispersion. This is because the optical signal has a bandwidth. In contrast, the noise component is not transformed by chromatic dispersion because the noise light does not carry information. Accordingly, a noise component in a time domain of the zero level can be reduced by suppressing the amplitude noise of the ON level with the optical limiter, and by equalizing the waveform of the optical signal with the optical circuit 4. When the waveform is transformed by chromatic dispersion, the spectrum of the signal light does not change.

Furthermore, the optical circuit 2 provided at the input side of the optical limiter 3 widens the width of each pulse as one method for increasing the existence ratio of the ON level of an optical signal. However, the optical circuit 2 in the embodiments is not limited to this method. For example, the waveform of an optical signal may be transformed so that new optical pulses exist between pulses of the input optical signal as illustrated in FIG. 11A or 11B. In either case, the optical circuit 2 performs waveform transformation to reduce the ratio of the duration when the optical intensity is at the zero level in each time slot of the optical signal. Moreover, the optical circuit 2 may flatten the pulse peak of the optical signal, or may make the intensity of each pulse constant. Furthermore, the optical intensity may not be constant, and non-zero portions may be increased as illustrated in FIG. 11A or 11B.

As described above, with the optical signal processing device 1 according to the embodiments, the amplitude noise of an optical signal can be gathered in the ON level region of the optical signal. Therefore, a noise suppression effect is higher than conventional optical limiters. In other words, with the optical signal processing device 1 according to the embodiments, a remarkable noise suppression effect can be obtained even under a loose limiter operating condition in comparison with the conventional optical limiters. Accordingly, with the configurations according to the embodiments, an amplitude noise is reduced while suppressing changes in the waveform and the spectrum of an optical signal as much as possible, and the optical S/N ratio is improved.

Application examples of the optical signal processing device will be explained in detail.

In the example illustrated in FIG. 12, a WDM optical signal is input to the optical signal processing device 1. The WDM optical signal carries a plurality of signals by using mutually different wavelengths $\lambda_{S1}$ to $\lambda_{SN}$. The optical signal processing device 1 is, for example, as described in the first to the seventh embodiments.

Generally, a plurality of optical signals carried by WDM light are not synchronous one another, and their polarization states are at random. Moreover, the total sum of the peak powers of the optical signals is not constant in a time domain. Accordingly, in the conventional technology, waveform shaping and noise suppression are performed for each of the optical signals obtained by demultiplexing the WDM light into channels (namely, for each wavelengths).

In contrast, in the optical signal processing device 1 according to the embodiments, the intensity noise of a WDM optical signal is directly suppressed. Accordingly, the WDM light is only input unchanged without being demultiplexed into channels, whereby the noise of each optical signal is suppressed in the optical signal processing device 1 according to the embodiments.

At the output end of the optical signal processing device 1, an optical bandpass filter that has the center of a transmission band in the vicinity of the center of each wavelength of the WDM optical signal may be provided. In this case, for example, an interleaver filter and a fiber grating may be combined. Alternatively, a band rejection optical filter for filtering off components other than the wavelength components of the WDM signal light may be provided at the output end of the optical signal processing device 1.

In the examples illustrated in FIGS. 13A and 13B, the optical signal processing device 1 is used in an optical communication system. The optical communication system transmits an optical signal from a transmitter 31 to a receiver 32 via an optical transmission line.

In the example illustrated in FIG. 13A, a repeater station 33 is provided between the transmitter 31 and the receiver 32. The optical signal processing device 1 is provided within the repeater station 33. The optical signal processing device 1 suppresses the noise of the optical signal received from an optical transmission line A, and guides the signal to an optical transmission line B. The optical transmission lines A and B may have a configuration for transmitting an optical signal while amplifying the power of the optical signal with an optical amplifier, a configuration optimally designed to compensate for the chromatic dispersion of the transmission line fiber, or other configurations.

On the optical transmission lines, a plurality of repeater stations may be provided. In this case, the optical signal processing device 1 may be provided in all or some of the repeater stations. The optical signal processing device 1 provided in the repeater station does not always need to include the optical circuit 4 illustrated in FIG. 1. Namely, for example, if chromatic dispersion is provided by the optical circuit 2 illustrated in FIG. 1, this chromatic dispersion may be compensated for in another repeater station, or in a receiving station. The receiving station may compensate for the chromatic dispersion of the optical transmission line, and chromatic dispersion occurring in each optical signal processing device 1.

In the example illustrated in FIG. 13B, the optical signal processing device 1 is provided in the vicinity of the receiver 32. In this example, the optical signal processing device 1 and the receiver 32 are provided within the receiving station 34. In this case, the receiver 32 can receive an optical signal the noise of which is suppressed.

In some of the recent optical fiber communication systems, an error correction code is added in advance to an optical signal, and an error correction process is executed by a receiving station. Accordingly, the requested performance of an error correction may be relaxed and the redundancy of an error correction code may be reduced by improving the optical S/N ratio and the Q factor with the optical signal processing device according to the embodiments. As a result, a configuration of a communication system is simplified, a WDM transmission with a narrow wavelength interval, and the like can be implemented. Furthermore, the processing time of a digital signal processing circuit is reduced when a received signal is processed in a receiving station.

As described above, by using the optical signal processing device according to the embodiments in an optical communication system, reception sensitivity is enhanced, and improvements in a transmission characteristic and an increase in a transmission margin is realized. Especially, in a system for performing an optical amplification relay transmission, effects such as a reduction in transmission optical power, an extension of a repeater interval of an optical amplifier, a reduction in the number of optical amplifiers, and the like can be expected.

Configurations and operations of the optical limiter will be explained in detail.

Figure 14:
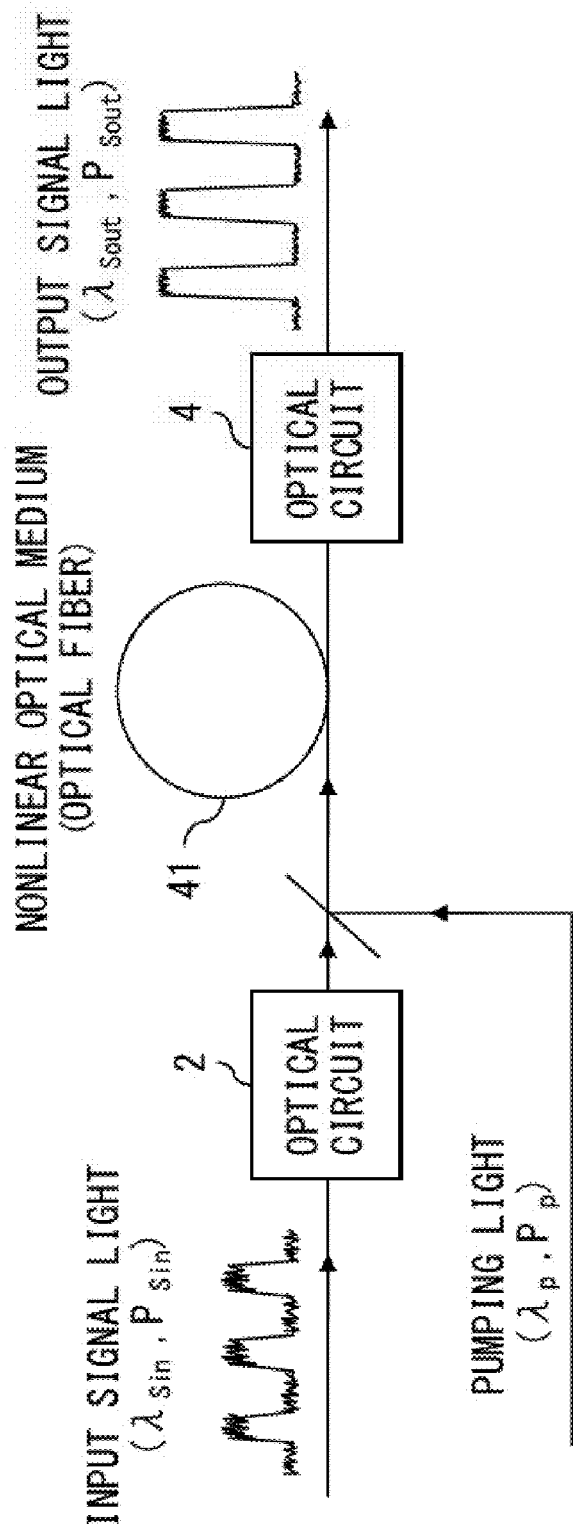
FIG. 14 is an explanatory view of a configuration and operations of the optical limiter.

FIG. 14 is an explanatory view of a configuration and operations of the optical limiter 3. As described above, the optical limiter 3 is provided between the optical circuits 2 and 4. The optical limiter 3 includes a nonlinear optical medium 41. The nonlinear optical medium 41 is, for example, an optical fiber.

In FIG. 14, signal light having a wavelength $\lambda_{Sin}$ and power $P_{Sin}$, and pumping light having a wavelength $\lambda_P$ and power $P_P$ are input to the nonlinear optical medium 41. $\lambda_{Sin}$ and $\lambda_P$ are different from each other. The pumping light is input to the nonlinear optical medium 41 after being controlled to be a particular polarization state by using a polarization controller. The signal light is nonlinearly amplified by the pumping light in the nonlinear optical medium 41. The wavelength of the signal light output from the nonlinear optical medium 41 is $\lambda_{Sout}$. An optical bandpass filter for extracting the wavelength component of the signal light is provided at the output side of the nonlinear optical medium 41 if necessary. The optical filter for extracting the signal light may be a band rejection filter for cutting off wavelength components (pumping light, etc.) other than the signal light, a WDM optical coupler, or the like.

If the nonlinear optical medium 41 is a third-order or second-order nonlinear optical medium, an optical parametric effect such as four-wave mixing (FWM), three-wave mixing (TWM), etc., which is caused by the pumping light, occurs in the nonlinear optical medium 41, and the signal light is parametrically amplified. The gain of the optical parametric amplification is almost constant regardless of $P_S$ if the power $P_P$ of the pumping light is sufficiently higher than the power $P_S$ of the signal light. However, if $P_S$ increases and $P_P$ is not recognized to be sufficiently higher than $P_S$, the power of the pumping light consumed to produce the optical parametric effect increases. As a result, the phenomenon called "depletion" that the power $P_P$ of the pumping light attenuates in the nonlinear optical medium 41 occurs.

FIGS. 15A and 15B are explanatory views of depletion. Here, assume that the signal light with the wavelength $\lambda_S$, and the pumping light with the wavelength $\lambda_P$ are input to an optical fiber as the nonlinear optical medium 41. Note that $\lambda_P$ may be longer or shorter than $\lambda_S$.

In the interaction between the signal light and the pumping light, idler light (wavelength $\lambda_I$) corresponding to the signal light is generated, for example, by four-wave mixing as illustrated in FIG. 15B. In the four-wave mixing, the powers of the signal light and the idler light are amplified. At this time, part of the energy of the pumping light is almost equally provided to the signal light and the idler light. The frequency $\omega_S$ of the signal light, the frequency $\omega_P$ of the pumping light, and the frequency $\omega_I$ of the idler light satisfy the above described equation (1).

Here, assume that the length and the loss of an optical fiber are respectively L and $\alpha$, for example, when the optical fiber is used as the nonlinear optical medium 41. For ease of explanation, also assume that the polarization states of all light waves are equal in the optical fiber. Further assume that the input power $P_P$ of the pumping light is sufficiently higher than those of the signal light and the idler light. For example, if the wavelength $\lambda_P$ of the pumping light is adjusted to a zero dispersion wavelength $\lambda_0$ of the optical fiber, the signal light and the idler light, which are output from the optical fiber, approximately obtain gains $G_S$ and $G_I$ that are represented by the following equations, respectively.

$$G_S = \exp(-\alpha L)[1 + \phi^2(L)] \qquad (2)$$

$$G_I = \exp(-\alpha L)\phi^2(L) \qquad (3)$$

$$\phi(L) = \gamma P_P(0)l(L) \qquad (4)$$

$$\gamma = \frac{\omega n_2}{cA_{eff}} \qquad (5)$$

where "Φ(L)" represents a nonlinear optical phase shift, and "$P_P(0)$" represents the input power of the pumping light.

$$l = (1 - e^{-\alpha L})/\alpha L$$

represents an interaction length. "γ" represents a third-order nonlinear coefficient. "$n_2$" and "$A_{eff}$" respectively represent a nonlinear refractive index and an effective core cross-sectional area within the optical fiber.

As represented by the above equations (2) to (5), the optical parametric gains $G_S$ and $G_I$ change with respect to the value of the product of the nonlinear coefficient, the input power of the pumping light and the interaction length. Especially, if a linear phase matching condition ($\lambda_P = \lambda_0$) is satisfied, $G_S$ and $G_I$ change depending on the square of the value of the product as represented by the equations (2) and (3). Here, the generation efficiency of the optical parametric effect highly depends on the polarization states of interacting light waves. Specifically, the generation efficiency of four-wave mixing becomes maximum if the polarization states of light waves input to the optical fiber are mutually identical. If the polarization states of light waves are mutually orthogonal, four-wave mixing hardly occurs. Accordingly, if the input power of the pumping light is sufficiently high, the signal light is selectively and parametrically amplified in the same polarization direction as the pumping light.

This specification assumes that the pumping light is controlled to be an optimum polarization state. Specifically, the polarization state of the signal light is monitored, and the polarization state of the pumping light may be actively controlled to be a state optimum for the polarization state of the signal light by using a polarization controller. Alternatively, a polarization diversity method for splitting the signal light into two mutually orthogonal polarization components and for again combining the two polarization components after the optical limiter process is executed for each of the polarization components with the same efficiency may be introduced. Moreover, to increase the gains $G_S$ and $G_I$, for example, $\lambda_P$ is set to a wavelength longer than $\lambda_0$, and a nonlinear phase matching by the anomalous dispersion of a nonlinear fiber may be used. This method significantly increases again compared with the above described linear phase matching although the bandwidth is narrowed. This method is suitably available according to an application condition.

Assume that the input power of the signal light input to the optical fiber is increased, and the power $P_P$ of the pumping light is not sufficiently higher than the power of the signal light in the above described model. In this case, the optical gains $G_S$ and $G_I$ are gradually saturated (namely, decreased). Especially, if the power $P_P$ of the pumping light is consumed to generate the optical parametric effect and the state called depletion that the power of the pumping light drops within the optical fiber occurs, the optical gains are quickly saturated.

If depletion of the pumping light occurs in the nonlinear optical medium 41, the gains in the nonlinear optical medium 41 are saturated (namely, decreased). As a result, the power of the signal light output from the nonlinear optical medium 41 does not become higher than a certain level even if the input power of the signal light is increased, and the nonlinear optical medium 41 operates as a so-called optical limiter. In the optical limiter, fluctuations in the output power are suppressed even if the power of input signal light fluctuates. Especially, the intensity noise or the amplitude noise of the ON level of the optical signal is suppressed by the optical limiter.

As described above, in the optical signal processing device 1 according to the embodiments, the optical limiter is implemented by increasing the input power of the signal light to an extent that the depletion of the pumping light occurs.

In the optical limiter 3, a nonlinear optical effect such as optical parametric amplification, etc. is used. In this case, the signal light is amplified by the pumping light in the nonlinear optical medium. Especially, if optical parametric amplification is used, an optical parametric gain produced by the optical parametric effect is obtained by increasing the power $P_P$ of the pumping light. Here, assuming that the power gain of the input power $P_{Sin}$ of the signal light is G (the above described $G_S$ or $G_I$), the output power $P_{Sout}$ of the signal light is represented by the following equation.

$$P_{Sout} = G P_{Sin} \qquad (6)$$

Here, if the gain G is made larger than 1, the power of the signal light is amplified. For example, an optical fiber is used as the nonlinear optical medium, and the length of the optical fiber and the power $P_P$ and the wavelength $\lambda_P$ of the pumping light are suitably adjusted, whereby a sufficiently large gain G can be obtained. At this time, the output power of the nonlinear optical medium can be made constant (or power fluctuations can be suppressed) by saturating the gain G. Moreover, an optical limiter amplifier irrespective of the polarization state of the signal light may be implemented by using a polarization diversity method, etc. With this optical limiter amplifier, waveform shaping for suppressing, for example, amplitude noise is realized. The response time of the optical parametric amplification within the optical fiber is ultra-high speed (several femtoseconds order), and an optical limiter amplifier of an ultra high-speed signal exceeding tera bps is expected.

The optical parametric amplification may be implemented, for example, with four-wave mixing within a third-order nonlinear optical medium such as an optical fiber, etc., three-wave mixing within a second-order nonlinear medium such as an $LiNbO_3$ (Periodically-poled LN) waveguide having a polarization reversal structure (quasi phase matching structure).

FIGS. 16A and 16B illustrate a relationship between a gain obtained in the nonlinear optical medium and the power of the signal light. Here, assume that the power of the pumping light is constant. In this case, if the input power $P_{Sin}$ of the signal light is low, the value of the gain (such as the optical parametric gain) G is almost constant ($G_0$ in FIGS. 16A and 16B). At this time, the signal light input to the nonlinear optical medium is linearly amplified similar to a normal optical amplifier.

In the meantime, in a region where the input power $P_{Sin}$ of the signal light is higher than the threshold power $P_1$, the gain G is saturated, and the obtained gain becomes smaller than that in a region where the input power of the signal light is low. In the optical signal processing device according to the embodiments, the nonlinear optical medium may be used in a gain saturation region by suitably controlling the power of the signal light and that of the pumping light. Namely, pumping light having the power required to generate a necessary gain in advance is input to the nonlinear optical medium. Then, by controlling the input power of the signal light to be equal to or higher than the threshold power $P_1$ illustrated in FIGS. 16A and 16B in the gain saturation state, the nonlinear optical medium operates as an optical limiter for the signal light.

Figure 17:
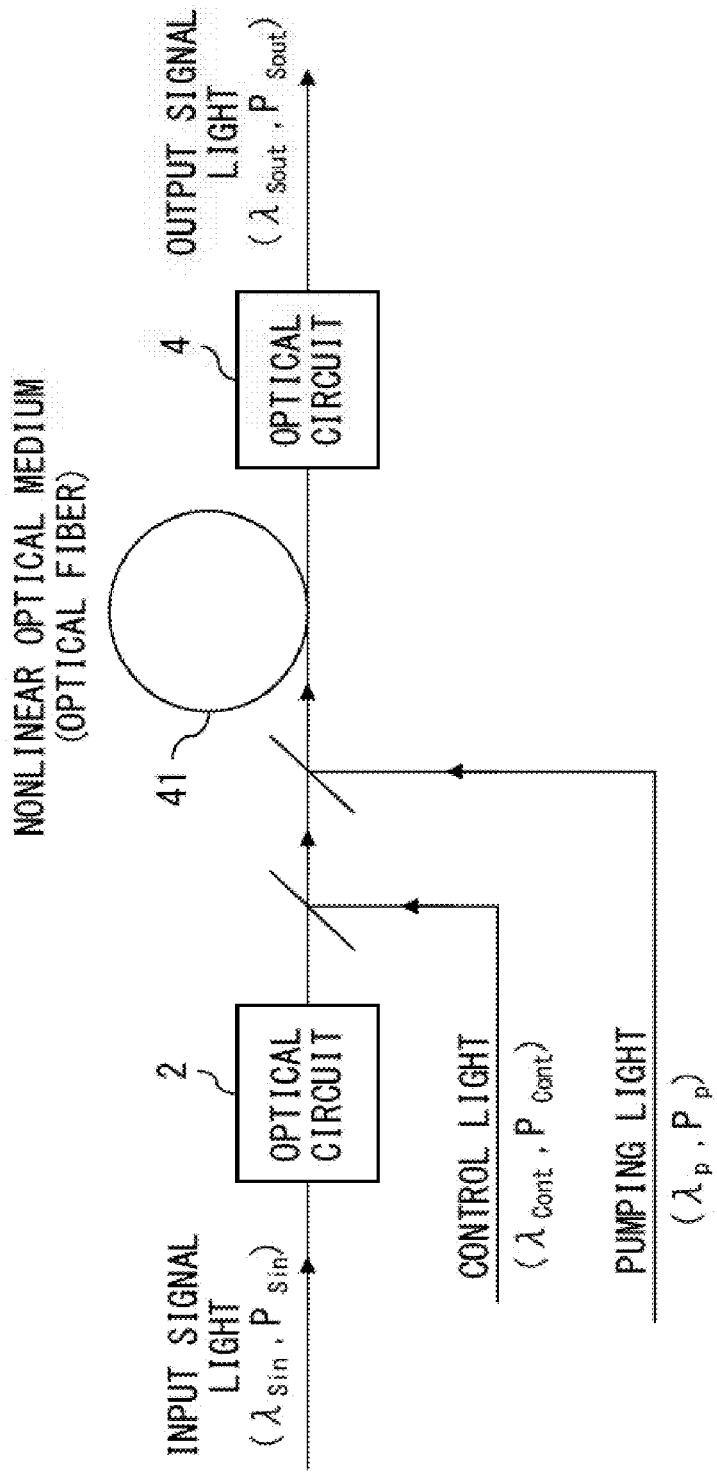
FIG. 17 illustrates a configuration using control light.

To the above described nonlinear optical medium, control light may be input in addition to the signal light and the pumping light as illustrated in FIG. 17. In this case, the control light is generated and controlled so that the sum of the power $P_{Sin}$ of the signal light and the power $P_{Cont}$ of the control light becomes equal to or higher than the threshold power $P_1$ illustrated in FIGS. 16A and 16B. The control light is, for example, a continuous wave (CW) light or a pulse light, which has a wavelength different from the signal light and the pumping light. Moreover, the control light may be polarization-controlled by the polarization controller so that an optimum limiter characteristic is obtained.

As described above, the optical signal processing device according to the embodiments includes the nonlinear optical medium operating as the optical limiter 3, the optical circuit 2 provided at the input side of the optical limiter 3, and the optical circuit 4 provided at the output side of the optical limiter 3. At this time, the power of the pumping light input to the nonlinear optical medium is controlled by a power controller so that a predetermined optical amplification gain (such as an optical parametric amplification gain) is obtained in the nonlinear optical medium. In the configuration illustrated in FIG. 14, the power of the optical signal output from the optical circuit 2 is controlled by the power controller so that the power of the optical signal becomes equal to or higher than the threshold power P. Moreover, in the configuration illustrated in FIG. 17, the power of the control light input to the nonlinear optical medium is controlled by the power controller so that the sum of the power of the optical signal and that of the control light becomes equal to or larger than the threshold power P. In addition, in the configuration illustrated in FIG. 17, the power of the optical signal output from the optical circuit 2 may be or may not be controlled. With such configurations, the optical limiter is implemented, and fluctuations in the amplitude of an optical signal is suppressed. Additionally, by restoring the existence ratio of the ON level of the optical signal to the state before the optical signal is input to the optical circuit 2 by the optical circuit 4 provided at the output side of the nonlinear optical medium, the amplitude noise of the zero level is suppressed.

In the optical limiter using the optical parametric effect, idler light is the phase-conjugate light of the input signal light as described with reference to FIG. 10. Accordingly, by providing the same phase distortion in the optical circuits 2 and 4, the distortions of the lights may be compensated. Therefore, as the dispersions of the optical circuits 2 and 4, dispersions having the same sign and the almost same absolute value may be adopted. Also a nonlinear effect such as a chirp, etc. may be compensated, and a method for significantly transforming a waveform and a spectrum with a chirp and dispersion may be used. The method for compensating for a wavelength distortion with optical phase conjugation is referred to, for example, in Japanese Laid-open Patent Publication No. 8-171102 (Patent No. 3494738). Additionally, the method for shaping a waveform with a nonlinear effect and dispersion is referred to, for example, in Japanese Laid-open Patent Publication No. 2003-209516 (Patent No. 4094854).

As an optical fiber used as the nonlinear optical medium, for example, a nonlinear optical fiber having an enhanced nonlinear optical effect is available. The length of the optical fiber is determined so that desired optical parametric amplification efficiency is obtained or an optical limiter effect is optimized. Moreover, to secure the bandwidth of optical parametric amplification to be sufficiently wide, for example, linear phase matching may be made by making the wavelength ($\lambda_P$) of the pumping light match or nearly match the zero dispersion wavelength ($\lambda_0$) of the optical fiber. With this configuration, the bandwidth of the optical parametric amplification is broadened. Additionally, the wavelength of the pumping light may be set to a wavelength longer than the zero dispersion wavelength of the optical fiber, and phase matching may be made by using a nonlinear phase shift. With this configuration, the efficiency of the optical parametric amplification is improved compared with the case represented by the above provided equations (1) and (2).

As the optical fiber, for example, a highly nonlinear fiber (HNLF) having an enhanced nonlinear optical effect is effective. Additionally, a configuration of improving a nonlinear refractive index by doping a core with germanium, bismuth, etc., a configuration of improving an optical power density by downsizing a mode field, a configuration using chalcogenide glass, a configuration using a photonic crystal fiber structure, or the like may be adopted as the optical fiber.

As other nonlinear optical media, a semiconductor optical amplifier of a quantum well structure, a semiconductor optical amplifier of a quantum dot structure, a silicon photonics waveguide, etc. are available. Also a device for producing a second-order nonlinear optical effect such as three-wave mixing, etc. is available as still other nonlinear optical media. In this case, for example, an $LiNbO_3$ waveguide (PPLN) having a quasi phase matching structure, a GaAlAs element, a second-order nonlinear optical crystal, etc. are available as these devices. A configuration of making wavelength allocation that enables phase matching is preferable even when a second-order nonlinear medium is used.

Pumping light (and/or control light) may be CW light or an optical pulse. If the pumping light is CW light, there is no need to control the timing of an optical signal carried by a signal light. Therefore, an optical signal processing device is implemented with a simple configuration. However, the production efficiency of a nonlinear optical effect depends on the peak power of pumping light. Accordingly, to secure a sufficient gain, sufficiently amplified pumping light may be input to the optical fiber. If stimulated brillouin scattering (SBS) occurs, input pumping light is reflected, which restricts the occurrence of optical parametric amplification. Stimulated brillouin scattering may be suppressed by using a method for providing a temperature distribution in the longitudinal direction of the optical fiber, or a method for expanding the spectrum of pumping light. The spectrum of pumping light can be expanded, for example, by making phase modulation or frequency modulation with a frequency lower than a signal carried by the signal light.

If the pumping light is optical pulse train, the peak power can be easily increased. Therefore, a large gain can be obtained. With this configuration, however, it is necessary to match the timings of an optical signal and a pumping light pulse. Therefore, a timing recovery circuit, etc. is required.

Gain saturation depends on the total sum of the peak powers of all channels of WDM signal light at the same timing. Accordingly, the total sum of the peak powers at the same timing may be averaged to generate gain saturation for all the signals on the average. FIG. 18 illustrates an implementation example where optical fibers are dividedly arranged and a different delay for each wavelength is provided between the optical fibers. The configuration for providing a different delay to signal light having a different wavelength is implemented, for example, by using a chromatic dispersion medium. This configuration is implemented, for example, with a dispersion fiber. By way of example, for a 100-Gbps WDM signal of two channels separated by 10 nm, the two channels can be averaged by providing a delay of 5 ps between the two channels. In this case, for example, an optical fiber of approximately 25 m, the chromatic dispersion of which is about 20 ps/nm/km, may be used.

In the optical signal processing device according to the embodiments, the phase of signal light is not affected while being amplified within the optical fiber. Accordingly, the above described waveform shaping/noise suppression method can be applied to signal light modulated with optical intensity modulation, optical phase modulation using an RZ pulse, optical frequency modulation, or the like.

For signal light modulated with optical phase modulation, reducing intensity fluctuations by the optical limiter is effective at reducing a phase noise caused by the intensity fluctuations although the phase noise itself is not directly suppressed. Especially, in an optical fiber transmission, an intensity noise is converted into a phase noise (AM/PM conversion) with a nonlinear optical effect within an optical fiber. The transmission limit of a phase-modulated optical signal depends on the phase noise. Accordingly, the phase noise caused by AM/PM conversion is reduced by suppressing an intensity noise with the optical signal processing device according to the embodiments, thereby improving the quality of the phase-modulated optical signal. Since also the optical S/N ratio is improved with the configurations of the embodiments, an optical signal is transmitted with high quality.

Fluctuations in the zero level may be further suppressed, for example, by arranging a saturable absorber at the input side or the output side of the optical signal processing device according to the embodiments. As the saturable absorber, a semiconductor saturable absorber, a semiconductor amplifier, a Mach-Zehnder interference optical fiber switch, a nonlinear optical loop mirror (NOLM) switch, or the like is available.

Feedback control system operated in the optical signal processing device will be explained.

Figure 19:
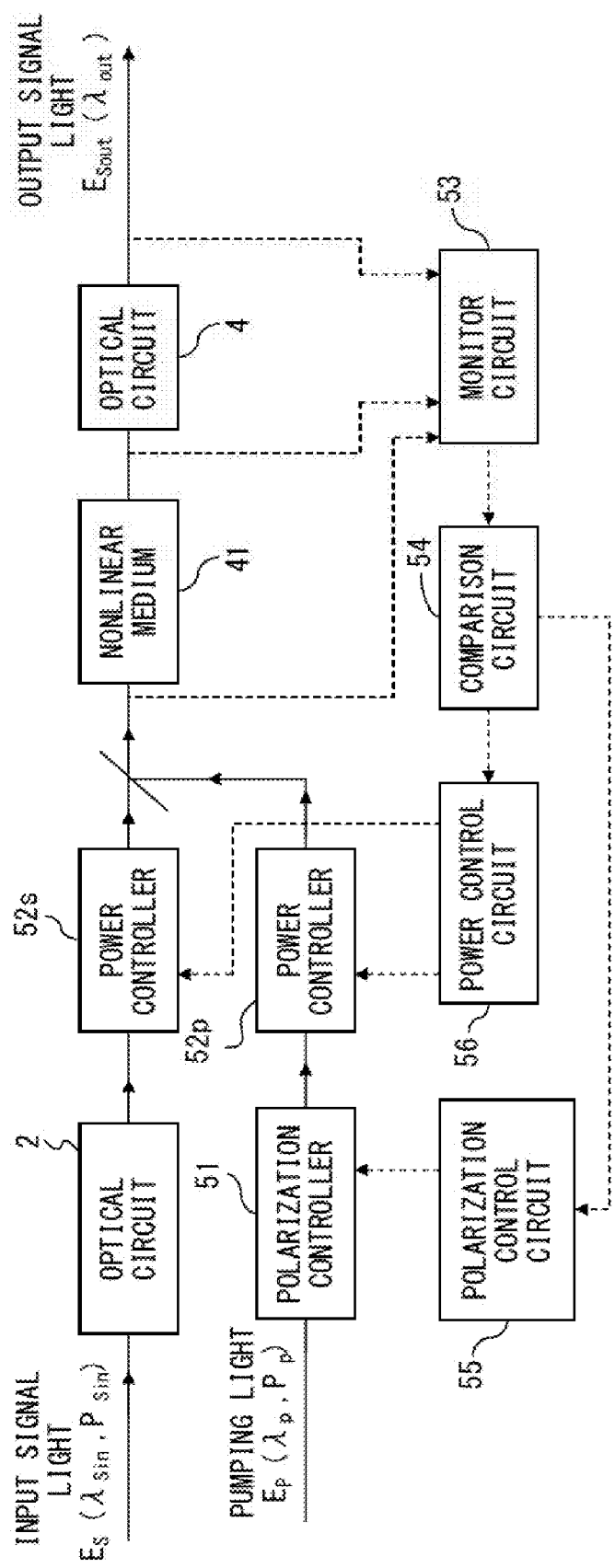
FIG. 19 is a block diagram (No. 1) illustrating an embodiment of an optical signal processing device having a feedback system.

FIG. 19 illustrates a configuration of an optical signal processing device having a feedback system. In this embodiment, a feedback control is performed for the characteristic of the optical limiter 3. The nonlinear optical medium is a second-order or third-order nonlinear optical medium, etc., and implemented, for example, with the above described optical fiber.

A polarization controller 51 controls the polarization state of pumping light in accordance with an instruction issued from a polarization control circuit 55. The polarization controller 51 is implemented, for example, with a wavelength plate polarization controller, an LiNbO3 polarization controller, a fiber-squeezer type polarization controller, a Faraday rotator, or the like.

A power controller 52p adjusts the power of pumping light the polarization state of which is controlled by the polarization controller 51. A power controller 52s adjusts the power of the optical signal output from the optical circuit 2. The power controllers 52p and 52s respectively control the powers of the pumping light and the optical signal in accordance with an instruction issued from the power control circuit 56. The power controllers 52p and 52s are implemented, for example, with an optical amplifier or an optical attenuator (or a combination of an optical amplifier and an optical attenuator), or the like.

A monitor circuit 53 monitors the power of the optical signal input to the nonlinear optical medium 41 and that of the optical signal output from the nonlinear optical medium 41. The monitor circuit 53 is configured by including, for example, an optical filter for extracting the wavelength λ of the optical signal, and a photo-detector for receiving an optical signal extracted by the optical filter.

A comparison circuit 54 calculates a gain in the nonlinear optical medium 41 on the basis of the input power and the output power of the optical signal. Moreover, the comparison circuit 54 compares the input power and/or the output power of the optical signal with predetermined threshold power if necessary.

A polarization control circuit 55 references the output of the comparison circuit 54, and instructs the polarization controller 51 to adjust the polarization state. The power control circuit 56 references the output of the comparison circuit 54, and instructs the power controllers 52p and 52s to adjust the optical power.

The optical signal processing device having the above described configuration may include a pumping light source and an optical bandpass filter although these components are not particularly illustrated. The pumping light source generates pumping light (CW light or optical pulse train). The optical bandpass filter is, for example, an optical wavelength filter having the same transmission frequency as the wavelength of the optical signal output from the nonlinear optical medium 41, and provided at the output side of the nonlinear optical medium 41. This optical bandpass filter extracts the wavelength component of the optical signal from the output light of the nonlinear optical medium 41.

The polarization controller 51, and the power controllers 52p and 52s are adjusted, for example, according to the following procedures.

Initially, the state of the polarization controller 51 is adjusted. Here, the polarization state of pumping light is adjusted so that a nonlinear optical effect efficiently occurs in the nonlinear optical medium 41. The nonlinear optical effect (especially, four-wave mixing) occurs with the highest efficiency in the case where the polarization states of pumping light and an optical signal are mutually identical. Accordingly, the polarization controller 51 may perform a control so that the polarization states of the pumping light and the optical signal match. However, the present invention is not limited to this configuration. The polarization directions of the pumping light and the optical signal may be controlled to be mutually different polarization states. Alternatively, the polarization state of the pumping light may be controlled to suit the polarization diversity method for splitting an optical signal into two orthogonal polarization components and for again combining the two components for which an equal nonlinear control has been respectively performed.

Then, the power control circuit 56 adjusts the state of the power controller 52p. Namely, the power of the pumping light is controlled so that a desired or sufficient optical parametric gain is obtained in the nonlinear optical medium 41. Afterwards, the power of the optical signal is increased while monitoring the optical parametric gain in the nonlinear optical medium 41, and the adjustment of the power controller 52s is terminated when the optical parametric gain drops by a predetermined level.

To what extent the optical parametric gain is dropped with the above described adjustment procedures depends on the level of a required optical limiter function (namely, a waveform shaping function and a noise suppression function). For example, in a system where the optical S/N ratio of an input optical signal is expected to be relatively favorable, precedence is given to the efficient obtainment of a gain over the waveform shaping/noise suppression effect, and the optical parametric gain may be slightly dropped. In contrast, in a system where the optical S/N ratio of an input optical signal is expected to be significantly degraded, the optical parametric gain may be significantly decreased to obtain a sufficient waveform shaping/noise suppression effect.

As described above, the input power of an optical signal is adjusted as occasion demands. For example, if the optical signal is a WDM signal, the power controller 52s may be controlled so that the total optical power of the WDM signal is held to be a certain value, or a value obtained by dividing the total optical power by the number of channels is held to be a certain value. Moreover, the optical signal output from the nonlinear optical medium 41 is monitored, and a feedback control may be performed for the powers of the optical signal and the pumping light so that the quality (optical S/N ratio, Q factor, bit error rate, etc.) of the optical signal is optimized.

FIG. 19 illustrates a configuration that does not use control light. However, the optical signal processing device according to the embodiments with the feedback system may use control light. In this case, the optical signal processing device includes a power controller for controlling the power of the control light. The power of the control light is controlled after the power of the pumping light is controlled.

Additionally, the optical signal processing device 1 according to the embodiments is also applicable to a Raman amplifier. In Raman amplification, a gain is obtained in a region of a wavelength longer than that of pumping light by approximately 100 nm. An optical signal (or a WDM signal) is allocated in this gain region, and the power of the optical signal is adjusted so that a Raman gain is saturated.

Figure 20:
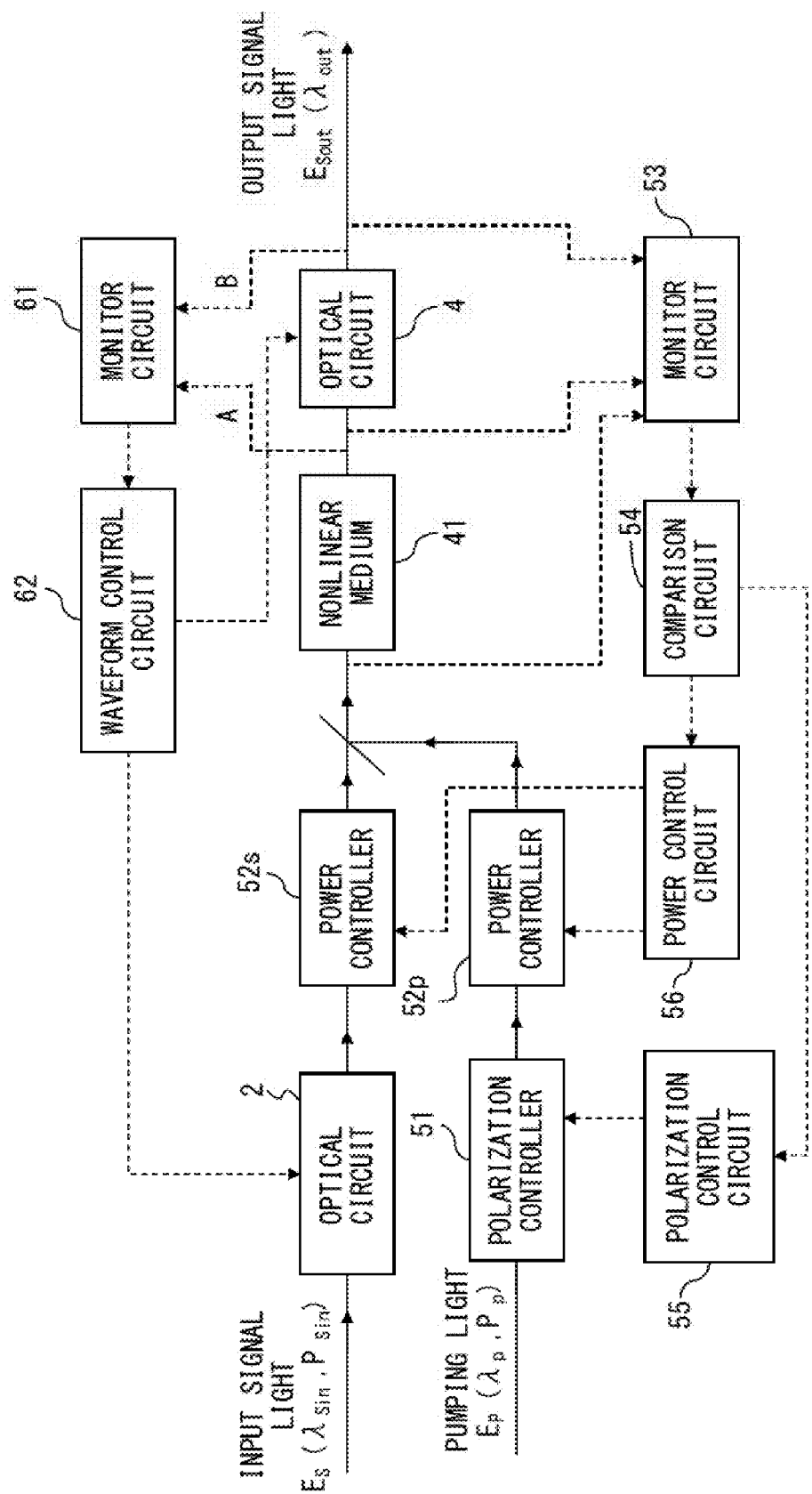
FIG. 20 is a block diagram (No. 2) illustrating an embodiment of the optical signal processing device having the feedback system.

FIG. 20 illustrates another configuration of the optical signal processing device having the feedback system. In this embodiment, a feedback control is performed not only for the optical limiter 3 but also for the characteristics of the optical circuits 2 and 4. Namely, this configuration includes a control system for optimizing the existence ratio of the ON level of an optical signal. The polarization state of pumping light and the powers of an optical signal and the pumping light are assumed to be adjusted with the procedures described with reference to FIG. 19.

A monitor circuit 61 monitors the quality of the optical signal output from the nonlinear optical medium 41. The monitor circuit 61 monitors the optical S/N ratio on the basis of an optical signal (monitor signal A) tapped at the input side of the optical circuit 4. The monitor circuit 61 also monitors the optical S/N ratio, the Q factor, and the code error rate on the basis of an optical signal (monitor signal B) tapped at the output side of the optical circuit 4.

A waveform control circuit 62 adjusts the characteristics of the optical circuits 2 and 4 in accordance with the quality of the optical signal, which is obtained by the monitor circuit 61, in order to optimize the quality. Here, the waveform control circuit 62 adjusts the existence ratio (pulse width in the implementation example) of the ON level of the optical signal output from the optical circuit 2 by adjusting the characteristic of the optical circuit 2. Moreover, the waveform control circuit 62 compensates for waveform transformation caused by the optical circuit 2 by adjusting the characteristic of the optical circuit 4. The optical circuits 2 and 4 are, for example, a variable dispersion generator and a variable dispersion compensator, which have a dispersion amount varying according to a control signal, although these circuits are not particularly limited.

The optical circuits 2 and 4 may be adjusted while the optical signal processing device is in operation. In this case, the characteristics of the optical circuits 2 and 4 are dynamically updated according to an operating environment. Moreover, the optical circuits 2 and 4 may be adjusted prior to the shipment of the optical signal processing device.

Experiments to verify the operation of the optical signal processing device according to the embodiments will be explained.

Figure 21:
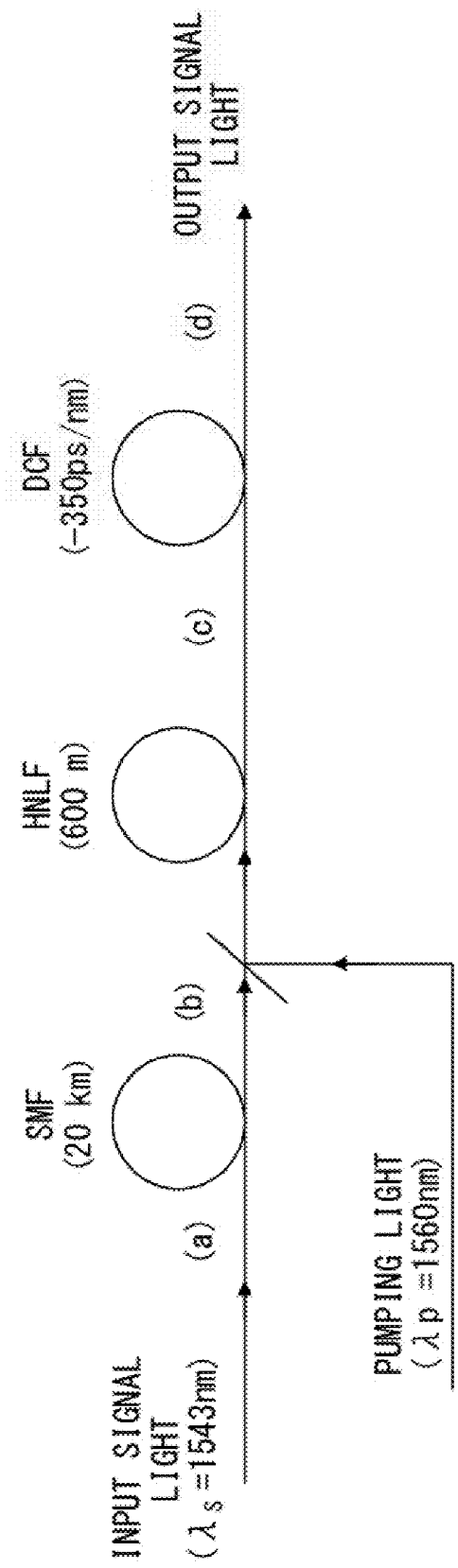
FIG. 21 illustrates an experimental system for verifying the operations of the optical signal processing device.

FIG. 21 illustrates an experimental system for verifying the operations of the optical signal processing device. In this experimental system, a single-mode optical fiber (SMF), a highly nonlinear fiber (HNLF) and a dispersion compensation fiber (DCF) are used as the optical circuit 2, the optical limiter 3 and the optical circuit 4, respectively. The SMF has a length of 20 km and chromatic dispersion of approximately +17 ps/nm/km. The HNLF has average zero dispersion in the vicinity of the wavelength of pumping light, and a third-order nonlinear coefficient of approximately 20 $W^{-1}$ $km^{-1}$. The DCF almost compensates for the anomalous dispersion of the SMF.

The wavelength, the pulse width (full width at half maximum) and the pulse repetitive cycle of an input optical signal are 1543 nm, 28 ps and 10 GHz, respectively. This signal is input to the SMF after the optical S/N ratio is degraded to approximately 19 dB by adding an ASE noise of an optical amplifier to the optical signal. The pumping light is CW light, and its wavelength is 1560 nm. The power of the optical signal is set to +10 dBm, whereas that of the pumping light is set to +21 dBm.

Figure 22D:
FIGS. 22A to 22D illustrate the waveforms of an optical signal obtained with experiments.
Figure 22C:
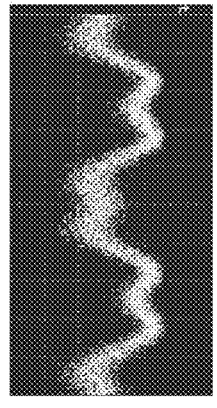
Figure 22B:
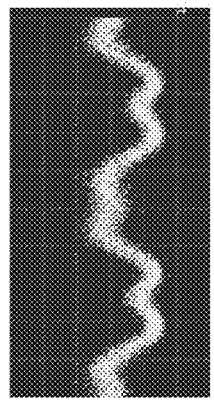
Figure 22A:
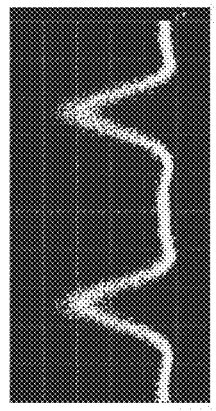

FIGS. 22A to 22D illustrate time waveforms of an optical signal obtained with the experiment. FIGS. 22A to 22D respectively illustrate the waveforms of the optical signal at observation points (a) to (d) illustrated in FIG. 21. Namely, the optical signal illustrated in FIG. 22A is input to the optical signal processing circuit according to the embodiments. Then, the waveform illustrated in FIG. 22B is obtained by increasing the existence ratio of the ON level of the optical signal (by widening the pulse width here) by using the SMF. Moreover, the noise (especially, the noise of the ON level) of the optical signal output from the HNLF that operates as the optical limiter 3 is suppressed as illustrated in FIG. 22C. The noise of the zero level of the optical signal output from the DCF is suppressed as illustrated in FIG. 22D. As a result, the optical S/N ratio was improved by approximately 2 dB.

Similar experiments were also conducted on a configuration that does not include the SMF and the DCF (namely, a configuration using only gain-saturated optical parametric amplification). As a result, the optical S/N ratio was improved by approximately 1 dB. As described above, it was verified that the optical S/N ratio is much more improved by increasing the existence ratio of the ON level of the optical signal at the input side of the optical limiter 3.

In the experiments on improvements in the optical S/N ratio by the optical signal processing circuit according to the embodiments, it was verified that the spectrum of an output optical signal hardly changes from an input optical signal. Namely, with the optical signal processing device according to the embodiments, the optical S/N ratio can be improved without changing the spectrum.

As described above, the optical signal processing device according to the embodiments reduces the optical intensity noise of an optical signal. As a result, the optical S/N ratio of the optical signal is improved, strict requirements (such as dispersion compensation of high precision, an error correction with high redundancy, etc.) are relaxed, and enhanced performance and a cost reduction in an optical network can be realized. Additionally, according to the embodiments, the intensity fluctuations and the intensity noise of an optical signal modulated with optical intensity modulation, optical phase modulation and optical frequency modulation are suppressed. Furthermore, power consumed in the optical network can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has(have) been described in detail, it

What is claimed is:

1. An optical signal processing device, comprising:
a waveform width widening unit configured to widen a waveform width of an optical signal;
an optical limiter circuit, to which the optical signal the waveform width of which is widened is input, configured to suppress an intensity of the optical signal in a region where an input intensity and an output intensity are not proportional; and
an optical circuit,
wherein the waveform width widening unit is further configured to adjust an ON level time period and a zero level time period by extending a time period in which the optical signal is at the ON level and by shortening the time period in which the optical signal is at the zero level,
the optical limiter circuit is further configured to suppress the noise on the ON level of the optical signal output from the waveform width widening unit, and
the optical circuit is configured to change the ratio of the ON level time period and the zero level time period of an optical signal output from the optical limiter circuit back into an original ratio of the ON level time period and the zero level time period of the optical signal.

2. The optical signal processing device according to claim 1, wherein
the waveform width widening unit is an optical fiber.

3. The optical signal processing device according to claim 1, wherein
the waveform width widening unit is a chromatic dispersion medium or a polarization mode dispersion medium.

4. The optical signal processing device according to claim 1, wherein
the waveform width widening unit is a dispersion generator.

5. The optical signal processing device according to claim 1, further comprising
a control unit configured to control the waveform width widening unit on the basis of quality of an optical signal output from the optical limiter circuit.

6. The optical signal processing device according to claim 1, further comprising
a recovery unit configured to restore a waveform width of an optical signal output from the optical limiter circuit to a waveform width before the optical signal is input to the waveform width widening unit.

7. The optical signal processing device according to claim 1, further comprising
a dispersion compensation unit configured to compensate for dispersion of an optical signal output from the optical limiter circuit.

8. The optical signal processing device according to claim 7, wherein
the dispersion compensation unit compensates for dispersion provided by the waveform width widening unit.

9. The optical signal processing device according to claim 7, wherein
the dispersion compensation unit is an optical fiber.

10. The optical signal processing device according to claim 1, wherein
the optical limiter circuit is an optical amplifier having a gain saturation region, and suppresses an intensity of the optical signal in the gain saturation region.

11. The optical signal processing device according to claim 1, wherein
the optical limiter circuit is an optical parametric amplifier using a third-order nonlinear optical effect or a second-order nonlinear optical effect.

12. The optical signal processing device according to claim 1, further comprising
a power controller configured to control power of an optical signal output from the waveform width widening unit, wherein:
the optical limiter circuit comprises a nonlinear optical medium, to which pumping light is input, and operates as an optical amplifier; and
the power controller controls the power of the optical signal and the pumping light so that a gain is saturated in the nonlinear optical medium.

13. The optical signal processing device according to claim 1, further comprising
a power controller configured to control power of control light input to the optical limiter circuit, wherein:
the optical limiter circuit comprises a nonlinear optical medium, to which pumping light is input, and operates as an optical amplifier; and
the power controller controls the power of the control light so that a gain is saturated in the nonlinear optical medium.

14. The optical signal processing device according to claim 1, wherein
the optical signal is a wavelength-division multiplexed optical signal obtained by multiplexing a plurality of different wavelengths.

15. An optical transmission system having a repeater station on an optical transmission line between a transmitting station and a receiving station, wherein
the repeater station comprises an optical signal processing device,
the optical signal processing device comprises:
a waveform width widening unit configured to widen a waveform width of an optical signal; and
an optical limiter circuit, to which the optical signal the waveform width of which is widened is input, configured to suppress an intensity of the optical signal in a region where an input intensity and an output intensity are not proportional; and
the receiving station comprises a dispersion compensation unit to compensate for dispersion occurring in the optical transmission line and the repeater station,
wherein the waveform width widening unit is further configured to adjust an ON level time period and a zero level time period by extending a time period in which the optical signal is at the ON level and by shortening the time period in which the optical signal is at the zero level,
the optical limiter circuit is further configured to suppress the noise on the ON level of the optical signal output from the waveform width widening unit, and
the dispersion compensation unit is configured to change the ratio of the ON level time period and the zero level time period of an optical signal output from the optical limiter circuit back into an original ratio of the ON level time period and the zero level time period of the optical signal.

16. An optical transmission system having a transmitting station, a receiving station, and an optical transmission line between the transmitting station and the receiving station, wherein:
the receiving station comprises:

an optical signal processing device; and
a dispersion compensation unit to compensate for dispersion occurring in the optical transmission line,
the optical signal processing device comprises:
a waveform width widening unit configured to widen a waveform width of an optical signal; and
an optical limiter circuit, to which the optical signal the waveform width of which is widened is input, configured to suppress an intensity of the optical signal in a region where an input intensity and an output intensity are not proportional,
wherein the waveform width widening unit is further configured to adjust an ON level time period and a zero level time period by extending a time period in which the optical signal is at the ON level and by shortening the time period in which the optical signal is at the zero level,
the optical limiter circuit is further configured to suppress the noise on the ON level of the optical signal output from the waveform width widening unit, and
the dispersion compensation unit is configured to change the ratio of the ON level time period and the zero level time period of an optical signal output from the optical limiter circuit back into an original ratio of the ON level time period and the zero level time period of the optical signal.

* * * * *